(12) United States Patent
Yang et al.

(10) Patent No.: US 8,717,865 B2
(45) Date of Patent: May 6, 2014

(54) METHOD AND APPARATUS FOR CONSTRUCTING VERY HIGH THROUGHPUT SHORT TRAINING FIELD SEQUENCES

(75) Inventors: Lin Yang, San Diego, CA (US); Didier Johannes Richard Van Nee, De Meern (NL); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 13/050,526

(22) Filed: Mar. 17, 2011

(65) Prior Publication Data

US 2011/0194545 A1 Aug. 11, 2011

Related U.S. Application Data

(63) Continuation-in-part of application No. 12/757,569, filed on Apr. 9, 2010.

(60) Provisional application No. 61/323,781, filed on Apr. 13, 2010, provisional application No. 61/226,609, filed on Jul. 17, 2009.

(51) Int. Cl.
*H04J 7/00* (2006.01)

(52) U.S. Cl.
USPC ........... 370/203; 370/328; 370/480; 455/103; 375/295; 375/362

(58) Field of Classification Search
None
See application file for complete search history.

(56) References Cited

U.S. PATENT DOCUMENTS

| | | | |
|---|---|---|---|
| 8,467,440 B2 * | 6/2013 | Aziz et al. | 375/233 |
| 2003/0035467 A1 | 2/2003 | Shimizu | |
| 2005/0181728 A1 * | 8/2005 | Hansen et al. | 455/41.2 |
| 2005/0226142 A1 * | 10/2005 | Moorti et al. | 370/208 |
| 2005/0281241 A1 * | 12/2005 | Webster et al. | 370/343 |
| 2007/0097946 A1 * | 5/2007 | Mujtaba | 370/349 |
| 2008/0008084 A1 | 1/2008 | Son | |
| 2010/0248635 A1 * | 9/2010 | Zhang et al. | 455/63.1 |
| 2010/0260159 A1 * | 10/2010 | Zhang et al. | 370/338 |
| 2010/0310002 A1 * | 12/2010 | Lauer et al. | 375/267 |
| 2011/0013547 A1 * | 1/2011 | Liao et al. | 370/310 |
| 2011/0013575 A1 | 1/2011 | Liao et al. | |

(Continued)

FOREIGN PATENT DOCUMENTS

WO WO2011008740 A2 1/2011

OTHER PUBLICATIONS

IEEE 802.11 Working Group: "Draft Amendment to Standard for Information Technology—Telecommunications and information exchange between systems—Local and metropolitan area networks-Specific requirements—Part 11: Wireless LAN Medium Access Control(MAC) and Physical Layer (PHY) specifications: Amendment number", IEEE P802.11N/D1.04, Sep. 1, 2006, pp. 1-318, XP040430018, IEEE, Piscataway, NJ, USA.

(Continued)

*Primary Examiner* — Brian Roberts
(74) *Attorney, Agent, or Firm* — Eric Ho

(57) ABSTRACT

Certain aspects of the present disclosure relate to a technique for constructing a short training field (STF) sequence of a Very High Throughput (VHT) preamble in an effort to reduce a peak-to-average power ratio (PAPR). The constructed STF sequence may feature a specific repetition period.

35 Claims, 19 Drawing Sheets

(56) References Cited

U.S. PATENT DOCUMENTS

| | | |
|---|---|---|
| 2011/0013583 A1 | 1/2011 | Yang et al. |
| 2011/0305233 A1* | 12/2011 | Seok .......................... 370/338 |
| 2012/0014336 A1* | 1/2012 | Seok .......................... 370/329 |

OTHER PUBLICATIONS

IEEE 802.11 Working Group: "IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE STD 802.11N-2009 (Amendment to IEEE STD 802.11-2007 As Amended by IEEE STD 802.11K-2008, IEEE STD 802.11R-2008, IEEE STD 802.11Y-2008, and IEEE STD 802.11W-2009, Sep. 11, 2009, pp. 1-502, XP002616237, IEEE, Piscataway, NJ, USA.

International Search Report and Written Opinion—PCT/US2010/041803, International Search Authority—European Patent Office—Feb. 1, 2011.

International Search Report and Written Opinion—PCT/US2011/032246, ISA/EPO—Jul. 13, 2011.

Lanante L, et al., "IEEE802.11ac Preamble with Legacy 802.11a/n Backward Compatibility", IEEE 802.11-YY/0847R0, [Online] Jul. 14, 2009, pp. 1-18, XP002606794, Retrieved from the Internet: URL:http://www.google.de/url"sa=t&source=web&cd=3&ved=0CBgQFjAC&url=https%3A%2F%2Fmentor.ieee.org%2F802.11%2Fdcn%2F10%2F11-10-0791-02-00ac-pha se-rotation-for-the-80-mhz-802-11ac-mixed-mode-packet.ppt&ei=u3bFT07TE8qh4QbZko26Aw&usg=AFQjCNHYliVi8HNnsZmesHd33saVGqWpOw> [retrieved on Oct. 25, 2010] pp. 3-12.

Syafei, W.A et al., "Design of 600 Mbps MIMO wireless Lan system using GLST coding and its FPGA implementation," Radio and Wireless Symposium, 2009. RWS '09. IEEE , vol., no., pp. 296-299, Jan. 18-22, 2009 doi: 10.1 109IRWS.2009.4957337.

Vermani Saamer, "VHT-LTF sequence for 80 MHz" IEEE 802.11-10/0802R0, [Online] Jul. 12, 2010, pp. 1-12, XP002616238, Retrieved from the Internet: URL:https://mentor.i eee.org/802.11/dcn/10/11-10-0802-00-00ac-vht-ltf-sequence-for-80-mhz.pptx> [retrieved on Jan. 10, 2011].

Wahyul Amien Syafei et al., "A design of next generation Gigabit MIMO wireless LAN system", Advanced Communication Technology (ICACT), 2010 the 12th International Conference on, IEEE, Piscataway, NJ, USA, Feb. 7, 2010, pp. 941-946, XP031653679, ISBN: 978-1-4244-5427-3.

* cited by examiner

| Cases | PAPR [dB] |
|---|---|
| No Rotation 80Msps (IFFT 256) | 8.1100 |
| With Rotation 80Msps (IFFT 256) | 5.0997 |
| No Rotation 320Msps (IFFT 1024) | 8.1100 |
| With Rotation 320Msps (IFFT 1024) | 7.3583 |
| No Rotation 320Msps (IFFT 256 + 4x TDI) | 8.9380 |
| With Rotation 320Msps (IFFT 256 + 4x TDI) | 5.2810 |

FIG. 5

| Cases | PAPR [dB] for Different [c1 c2 c3 c4] Pattern | | | | | | | |
|---|---|---|---|---|---|---|---|---|
| | [1 1 1 -1] | [1 1 -1 1] | [1 -1 1 1] | [-1 1 1 1] | [1 j 1 -j] | [1 j -1 j] | [1 1 j -1] | [j 1 -j 1] |
| No Rotation 80Msps (IFFT 256) | 2.2394 | 2.2394 | 2.2394 | 2.2394 | 2.2394 | 2.2394 | 2.2394 | 2.2394 |
| With Rotation 80Msps (IFFT 256) | 5.2497 | 5.2497 | 5.2497 | 5.2497 | 5.0997 | 4.7126 | 4.7126 | 5.0997 |
| No Rotation 320Msps (IFFT 1024) | 4.4722 | 4.3480 | 4.3480 | 4.4722 | 4.4722 | 4.4722 | 4.4722 | 4.4722 |
| With Rotation 320Msps (IFFT 1024) | 5.2497 | 5.2497 | 5.2497 | 5.2497 | 5.0997 | 4.7126 | 4.7126 | 5.0997 |
| No Rotation 320Msps (IFFT 256 + 4x TDI) | 5.3438 | 5.3144 | 5.3145 | 5.3402 | 4.9942 | 4.9859 | 4.9906 | 4.9952 |
| With Rotation 320Msps (IFFT 256 + 4x TDI) | 6.5011 | 6.4875 | 6.4876 | 6.4982 | 6.0762 | 5.9899 | 5.9939 | 6.0779 |

FIG. 6A

| Cases | PAPR [dB] for Different [c1 c2 c3 c4] Pattern | | | |
|---|---|---|---|---|
| | [1 j 1 j] | [1 j -1 -j] | [j -1 j -1] | [j -1 -j 1] |
| No Rotation 80Msps (IFFT 256) | | | | |
| With Rotation 80Msps (IFFT 256) | | | | |
| No Rotation 320Msps (IFFT 1024) | 5.8219 | 8.2600 | 5.8219 | 8.2600 |
| With Rotation 320Msps (IFFT 1024) | 7.4825 | 7.3583 | 7.4825 | 7.3583 |
| No Rotation 320Msps (IFFT 256 + 4x TDI) | | | | |
| With Rotation 320Msps (IFFT 256 + 4x TDI) | | | | |

FIG. 6B

| Cases | New Sequence with [c1 c2 c3 c4] = [1 j -1 j] and Walsh Cover | | | | | Corresp. Row Indices of Hadamard (48) |
|---|---|---|---|---|---|---|
| | PAPRs[dB] | | | | | |
| No Rotation 80Msps (IFFT 256) | [2.2394 3.5214 4.9019 5.2288 6.0770 6.8223 | 2.2394 3.5214 4.9019 5.2288 6.0770 6.8223 | 2.2394 3.5214 4.9019 5.2288 6.0770 6.8223 | 3.3119 4.2597 5.0802 5.6104 6.7182 9.2082 | 3.3119 4.2597 5.0802 5.6104 6.7182 9.2082 ⋮ | 3.3119 4.2597 5.0802 5.6104 6.7182 9.2082 ⋮ | [1 6 4 8 5 10 | 13 18 16 20 14 22 | 25 30 32 26 38 34 | 37 42 40 44 38 46 | 7 3 12 5 11 9 | 19 15 24 17 23 21 | 31 27 36 29 35 33 | 43 39 48 41 47 45] ⋮ |
| With Rotation 80Msps (IFFT 256) | [4.7126 6.2538 7.2700 7.7815 8.2105 9.3488 | 4.7126 6.2538 7.2700 7.7815 8.2105 9.3488 | 5.0997 6.3222 7.3155 7.8434 8.2391 9.6975 | 5.1536 6.3734 7.3271 7.9151 8.6207 9.7285 | 5.6904 6.9439 7.5333 8.1259 9.0873 12.2185 ⋮ | 5.6904 6.9439 7.5333 8.1259 9.0873 12.2185 ⋮ | [1 15 17 10 9 | 37 42 27 29 46 45 | 13 7 12 16 20 22 | 25 43 48 28 32 34 | 18 8 4 2 5 11 | 30 44 40 38 41 47 | 19 3 24 23 26 21 | 31 39 36 35 33] ⋮ |
| No Rotation 320Msps (IFFT 1024) | [4.4722 5.8947 7.2849 7.6055 8.4862 9.2777 | 4.4722 5.8947 7.2849 7.6055 8.4862 9.2777 | 4.4722 5.8947 7.2849 7.6055 8.4862 9.2777 | 5.6731 6.4973 7.2946 7.9401 8.9910 11.3623 | 5.6731 6.4973 7.2946 7.9401 8.9910 11.3623 ⋮ | 5.6731 6.4973 7.2946 7.9401 8.9910 11.3623 ⋮ | [1 18 16 2 14 22 | 37 30 28 44 46 34 | 13 6 4 20 26 10 | 25 42 48 40 32 38 | 7 3 12 17 23 29 | 19 39 24 29 11 45 | 31 15 36 35 21 | 43 27 48 47 41 33] ⋮ |
| With Rotation 320Msps (IFFT 1024) | [4.7126 6.2538 7.2700 7.7815 8.2105 9.6975 | 4.7126 6.2538 7.2700 7.7815 8.2105 9.6975 | 5.0997 6.3222 7.3155 7.8434 8.2391 9.7285 | 5.1536 6.3734 7.3271 7.9151 8.6207 9.8672 | 5.6904 6.9439 7.5333 8.1259 9.0873 12.2185 ⋮ | 5.6904 6.9439 7.5333 8.1259 9.0873 12.2185 ⋮ | [1 6 15 17 10 22 | 37 42 27 29 46 34 | 13 17 12 16 20 11 | 25 43 48 28 32 47 | 18 8 38 5 | 30 44 40 38 41 45 | 19 3 24 23 26 21 | 31 15 36 35 33] ⋮ |
| No Rotation 320Msps (IFFT 256 + 4x TDI) | [4.9859 5.9281 6.8073 7.5946 8.1733 9.2675 | 4.9906 6.0505 6.8272 7.7593 8.4109 9.3057 | 4.9952 6.0744 7.1525 7.8619 8.4491 9.5759 | 4.9952 6.2810 7.1605 7.8974 8.5538 9.5821 | 5.2730 6.6840 7.2309 7.9607 8.6112 9.7225 | 5.5839 6.7107 7.4104 8.0077 8.9227 11.9731 ⋮ | [1 31 44 40 23 11 | 37 42 8 38 35 22 | 13 43 48 16 26 47 | 25 43 48 16 29 34 | 18 3 12 20 46 33 | 30 15 17 28 10 45 | 19 4 24 32 41 33 | 7 39 36 2 14 21] ⋮ |
| With Rotation 320Msps (IFFT 256 + 4x TDI) | [5.0295 7.0312 7.8743 8.4880 9.1672 10.1276 | 5.9899 7.0396 7.9791 8.5412 9.1810 10.3956 | 5.9939 7.2073 8.1785 8.6575 9.2607 10.4691 | 6.0762 7.2073 8.1794 8.9242 9.2839 10.4910 | 6.1701 7.6626 8.4365 8.9826 9.6608 10.6903 | 6.8055 7.8112 8.4544 9.0222 10.0388 12.9862 | 6.8772 7.8640 8.4551 9.1115 10.1164 13.1581 ⋮ | [30 7 39 38 5 45 | 44 48 15 40 32 9 | 37 25 42 48 12 23 35 11 | 13 9 27 16 46 34 | 18 3 17 28 26 21 | 19 3 17 28 41 33 | 31 4 24 20 14 21] ⋮ |

FIG. 8

| Cases | | PAPRs [dB] — 902 | Corresp. Row Indices of Hadamard (12) — 904 |
|---|---|---|---|
| Phase Rotation Pattern [c1 c2 c3 c4]=[1 j -1 j] | No Rotation 320Msps (IFFT 1024) | [4.4722  5.6731  5.8947  6.4973  7.2849  7.2946... 7.6055  7.9401  8.4862  8.9910  9.2777  11.3623] | [1  7  6  3  4  12  8  5... 2  11  10  9] |
| | With Rotation 320Msps (IFFT 1024) | [4.7126  6.2538  6.3222  6.3734  6.9439  7.3155... 7.3271  7.9151  8.2105  8.6207  9.7285  9.8672] | [1  6  7  8  3  12  4  2... 10  5  11  9] |
| Phase Rotation Pattern [c1 c2 c3 c4]=[1 -1 1 1] or [1 1 -1 1] | No Rotation 320Msps (IFFT 1024) | [4.3480  5.3339  5.5298  6.4973  7.2849  7.2945... 7.2946  7.6055  8.3233  8.4862  9.2777  11.3623] | [1  7  6  3  4  5  12  8... 11  2  10  9] |
| | With Rotation 320Msps (IFFT 1024) | [5.2497  6.2513  6.5317  6.6986  7.9122  7.9487... 8.0905  8.3698  8.9994  9.3841  9.8326  11.5364] | [1  7  6  3  4  8  12  5... 2  11  10  9] |

FIG. 9

METHOD AND APPARATUS FOR CONSTRUCTING VERY HIGH THROUGHPUT SHORT TRAINING FIELD SEQUENCES

CLAIM OF PRIORITY UNDER 35 U.S.C. §119

The present Application for Patent claims benefit of Provisional Application Ser. No. 61/323,781, entitled "CONSTRUCTING VERY HIGH THROUGHPUT SHORT TRAINING FIELD SEQUENCES", filed Apr. 13, 2010, and assigned to the assignee hereof and hereby expressly incorporated by reference herein.

CLAIM OF PRIORITY UNDER 35 U.S.C §120

The present Application for Patent is a continuation-in-part of patent application Ser. No. 12/757,569, entitled "CONSTRUCTING VERY HIGH THROUGHPUT SHORT TRAINING FIELD SEQUENCES", filed Apr. 9, 2010, pending, which claims benefit of Provisional Application Ser. No. 61/226,609, entitled "CONSTRUCTING VERY HIGH THROUGHPUT SHORT TRAINING FIELD SEQUENCES", filed Jul. 17, 2009, and assigned to the assignee hereof and hereby expressly incorporated by reference herein.

BACKGROUND

1. Field

Certain aspects of the present disclosure generally relate to wireless communications and, more particularly, to methods and apparatus for constructing a very high throughput short training field (VHT-STF) sequence as a part of transmission preamble for Very High Throughput (VHT) wireless systems.

2. Background

The Institute of Electrical and Electronics Engineers (IEEE) 802.11 Wide Local Area Network (WLAN) standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A VHT Short Training Field (STF) is a part of transmission preamble signal in VHT wireless systems, and can be utilized at a receiver side for start-of packet detection and automatic gain control (AGC) settings. Methods and apparatuses are proposed in the present disclosure for constructing the VHT-STF sequence with a specific repetition period in an effort to minimize (or at least reduce) a peak-to-average power ratio (PAPR) at a transmitter node.

SUMMARY

Certain aspects of the present disclosure support a method for wireless communications. The method generally includes constructing a short training field (STF) sequence with a repetition period by using STF symbol values associated with the IEEE 802.11n standard, wherein the STF symbol values cover at least a portion of bandwidth of a first size, and each of the STF symbol values is repeated one or more times for different subcarriers, rotating phases of symbols of the STF sequence per bandwidth of the first size in an effort to reduce a peak-to-average power ratio (PAPR) during transmission of the STF sequence, and transmitting the STF sequence over a wireless channel by utilizing a bandwidth of a second size.

Certain aspects of the present disclosure provide an apparatus for wireless communications. The apparatus generally includes a first circuit configured to construct a short training field (STF) sequence with a repetition period by using STF symbol values associated with the IEEE 802.11n standard, wherein the STF symbol values cover at least a portion of bandwidth of a first size, and each of the STF symbol values is repeated one or more times for different subcarriers, a second circuit configured to rotate phases of symbols of the STF sequence per bandwidth of the first size in an effort to reduce a peak-to-average power ratio (PAPR) during transmitting the STF sequence, and a transmitter configured to transmit the STF sequence over a wireless channel by utilizing a bandwidth of a second size.

Certain aspects of the present disclosure provide an apparatus for wireless communications. The apparatus generally includes means for constructing a short training field (STF) sequence with a repetition period by using STF symbol values associated with the IEEE 802.11n standard, wherein the STF symbol values cover at least a portion of bandwidth of a first size, and each of the STF symbol values is repeated one or more times for different subcarriers, means for rotating phases of symbols of the STF sequence per bandwidth of the first size in an effort to reduce a peak-to-average power ratio (PAPR) during transmission of the STF sequence, and means for transmitting the STF sequence over a wireless channel by utilizing a bandwidth of a second size.

Certain aspects of the present disclosure provide a computer-program product for wireless communications. The computer-program product includes a computer-readable medium comprising instructions executable to construct a short training field (STF) sequence with a repetition period by using STF symbol values associated with the IEEE 802.11n standard, wherein the STF symbol values cover at least a portion of bandwidth of a first size, and each of the STF symbol values is repeated one or more times for different subcarriers, rotate phases of symbols of the STF sequence per bandwidth of the first size in an effort to reduce a peak-to-average power ratio (PAPR) during transmission of the STF sequence, and transmit the STF sequence over a wireless channel by utilizing a bandwidth of a second size.

Certain aspects of the present disclosure provide an access point. The access point generally includes at least one antenna, a first circuit configured to construct a short training field (STF) sequence with a repetition period by using STF symbol values associated with the IEEE 802.11n standard, wherein the STF symbol values cover at least a portion of bandwidth of a first size, and each of the STF symbol values is repeated one or more times for different subcarriers, a second circuit configured to rotate phases of symbols of the STF sequence per bandwidth of the first size in an effort to reduce a peak-to-average power ratio (PAPR) during transmitting the STF sequence, and a transmitter configured to transmit, via the at least one antenna, the STF sequence over a wireless channel by utilizing a bandwidth of a second size.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 illustrates example of peak-to-average power ratio (PAPR) results for VHT-STF sequences designed according to a legacy-based approach in accordance with certain aspects of the present disclosure.

FIGS. 6A-6B illustrate examples of PAPR results for VHT-STF sequences designed based on a new sequence approach in accordance with certain aspects of the present disclosure.

FIG. 8 illustrates example of PAPR results for Walsh covered VHT-STF sequences in accordance with certain aspects of the present disclosure.

FIG. 9 illustrates example of PAPR results for simplified Walsh covered VHT-STF sequences in accordance with certain aspects of the present disclosure.

DETAILED DESCRIPTION

Figure 1:
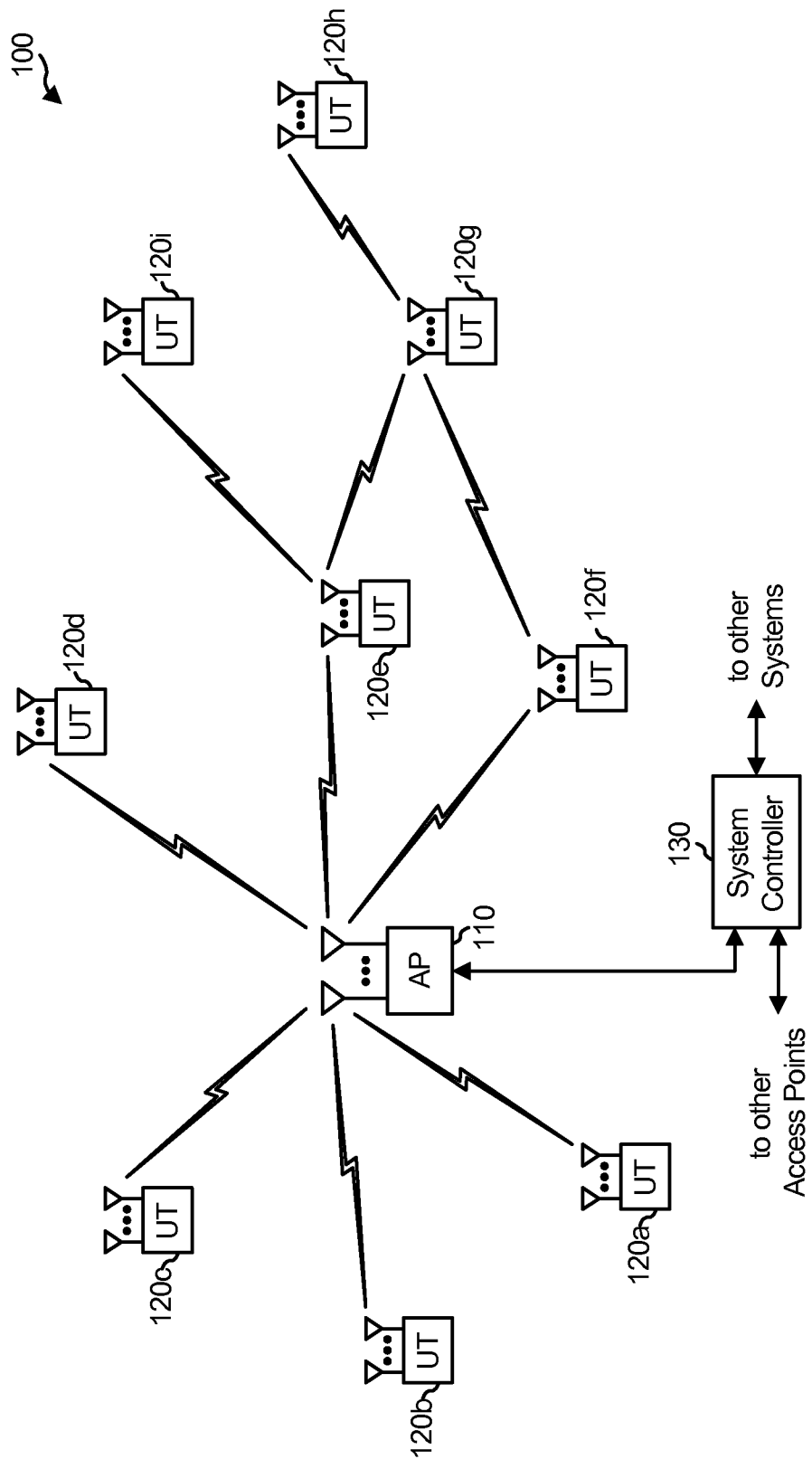
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, a headset, a sensor or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Several aspects of a wireless network will now be presented with reference to FIG. 1. The wireless network 100 is shown with several wireless nodes, generally designated as nodes 110 and 120. Each wireless node is capable of receiving and/or transmitting. In the discussion that follows the term "receiving node" may be used to refer to a node that is receiving and the term "transmitting node" may be used to refer to a node that is transmitting. Such a reference does not imply that the node is incapable of performing both transmit and receive operations.

In an aspect of the present disclosure, the wireless network 100 may represent the Institute of Electrical and Electronics Engineers (IEEE) 802.11 Wide Local Area Network (WLAN) based on Very High Throughput (VHT) protocol for signal transmissions utilizing a carrier frequency of 5 GHz (i.e., the IEEE 802.11ac standard) or utilizing a carrier frequency of 60 GHz (i.e., the IEEE 802.11ad standard) targeting aggregate throughputs above 1 Gigabits per second. The VHT 5 GHz specification may utilize a wider channel bandwidth, which may comprise two 40 MHz channels for achieving 80 MHz bandwidth, therefore doubling the Physical layer (PHY) data rate with negligible increase in cost compared to the IEEE 802.11n wireless communications standard.

In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console or any other suitable wireless node.

In an aspect of the present disclosure, at the access point 110, a very high throughput short training field (VHT-STF) sequence may be constructed as a part of VHT preamble to be transmitted to one or more access terminals 120. The VHT-STF sequence may be utilized at the access terminal 120 for start-of packet detection and automatic gain control (AGC) settings. The construction of VHT-STF sequence may be performed in an effort to minimize (or at least reduce) a peak-to-average power ratio (PAPR) at a transmitter of the access point 110. In an aspect, the transmitter of the access point 110 may comprise one or more antennas for communication with the access terminals 120.

One or more access terminals 120 may be equipped with multiple antennas to enable certain functionality. With this configuration, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support multiple-input multiple-output (MIMO) technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA) or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
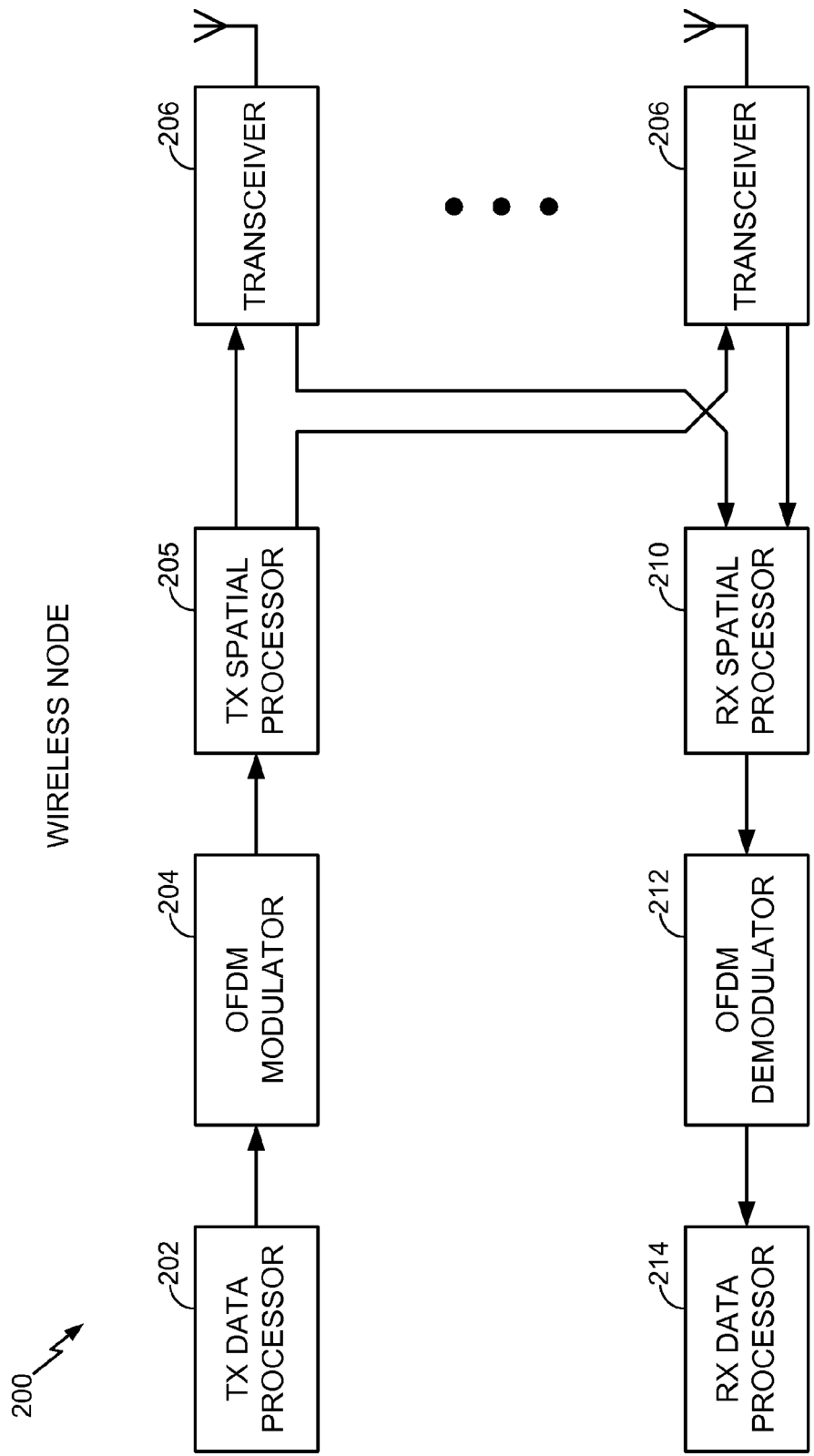
FIG. 2 illustrates a block diagram of an example of signal processing functions of a physical layer (PHY) of a wireless node in the wireless communications network of FIG. 1 in accordance with certain aspects of the present disclosure.

FIG. 2 illustrates a conceptual block diagram illustrating an example of the signal processing functions of the Physical (PHY) layer. In a transmit mode, a TX data processor 202 may be used to receive data from the Media Access Control (MAC) layer and encode (e.g., Turbo code) the data to facilitate forward error correction (FEC) at the receiving node. The encoding process results in a sequence of code symbols that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator may split the modulation symbols into parallel streams. Each stream may be then mapped to an OFDM subcarrier and then combined together using an Inverse Fast Fourier Transform (IFFT) to produce a time domain OFDM stream.

A TX spatial processor 205 may perform spatial processing on the OFDM stream. This may be accomplished by spatially precoding each OFDM and then providing each spatially precoded stream to a different antenna 208 via a transceiver 206. Each transmitter 206 may modulate an RF carrier with a respective precoded stream for transmission over the wireless channel.

In a receive mode, each transceiver 206 may receive a signal through its respective antenna 208. Each transceiver 206 may be used to recover the information modulated onto an RF carrier and provide the information to a RX spatial processor 210.

The RX spatial processor 210 may perform spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC) or some other suitable technique. If multiple spatial streams are destined for the wireless node 200, they may be combined by the RX spatial processor 210.

In wireless nodes implementing OFDM, the stream (or combined stream) from the RX spatial processor 210 may be provided to an OFDM demodulator 212. The OFDM demodulator 212 may convert the stream (or combined stream) from time-domain to the frequency domain using a Fast Fourier Transform (FFT). The frequency domain signal may comprise a separate stream for each subcarrier of the OFDM signal. The OFDM demodulator 212 may recover the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 may detect which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 may then use the sequence of code symbol LLRs in order to decode the data that was originally transmitted before providing the data to the MAC layer.

In an aspect of the present disclosure, the TX data processor 202 may be configured to generate a VHT-STF sequence as a part of VHT preamble transmitted from the wireless node 200 to one or more user terminals (not shown). The VHT-STF sequence may be utilized at a user terminal for start-of packet detection and AGC settings. The VHT-STF sequence may be constructed in an effort to minimize (or at least reduce) a level of PAPR at the transmitter 206 of the wireless node 200.

Figure 3:
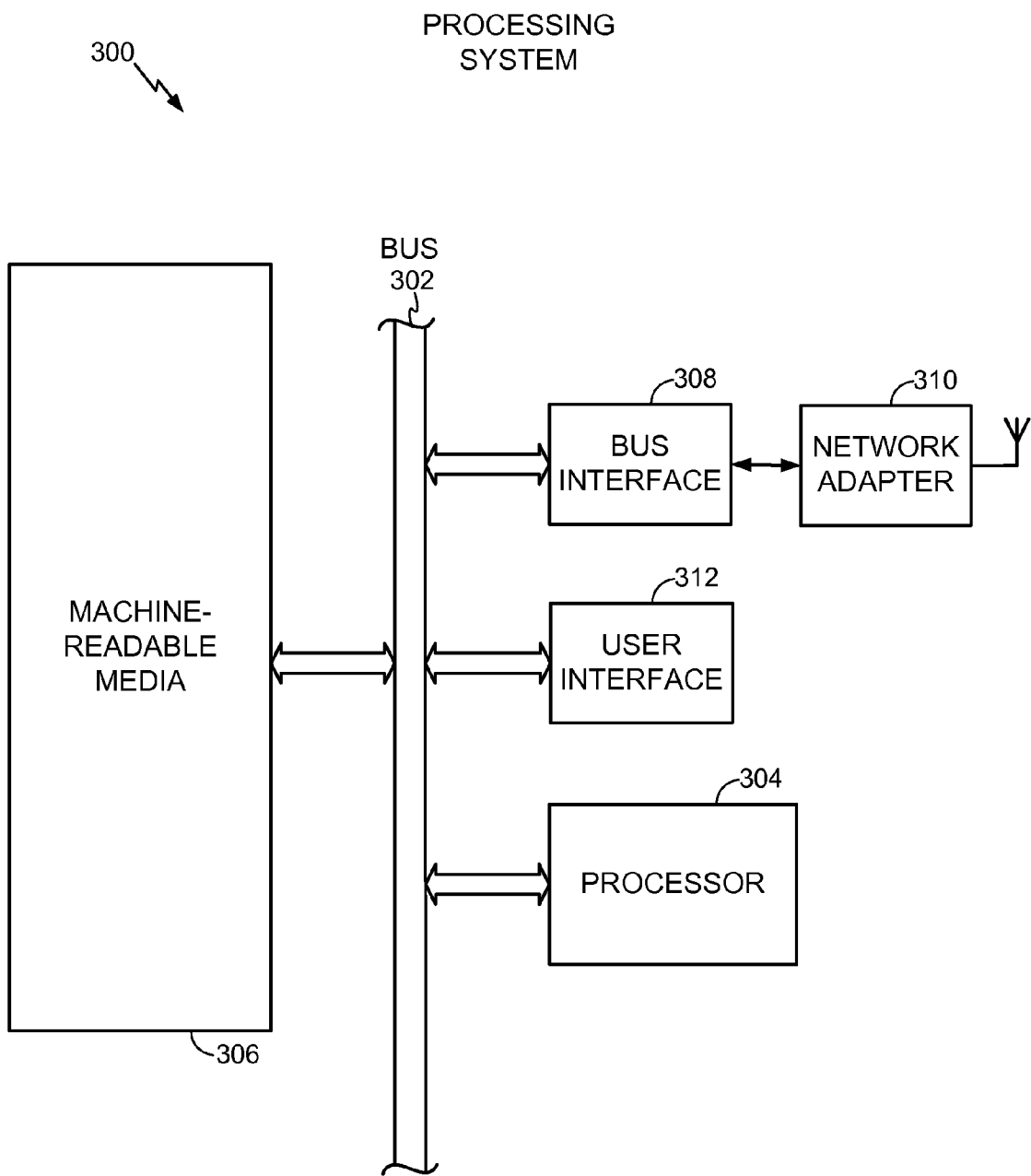
FIG. 3 illustrates a block diagram of an exemplary hardware configuration for a processing system in a wireless node in the wireless communications network of FIG. 1 in accordance with certain aspects of the present disclosure.

FIG. 3 illustrates a conceptual diagram illustrating an example of a hardware configuration for a processing system in a wireless node. In this example, the processing system 300 may be implemented with a bus architecture represented generally by bus 302. The bus 302 may include any number of interconnecting buses and bridges depending on the specific application of the processing system 300 and the overall design constraints. The bus may link together various circuits including a processor 304, machine-readable media 306 and a bus interface 308. The bus interface 308 may be used to connect a network adapter 310, among other things, to the processing system 300 via the bus 302. The network adapter 310 may be used to implement the signal processing functions of the PHY layer. In the case of an access terminal 110 (see FIG. 1), a user interface 312 (e.g., keypad, display, mouse, joystick, etc.) may also be connected to the bus. The bus 302 may also link various other circuits such as timing sources, peripherals, voltage regulators, power management circuits, and the like, which are well known in the art, and therefore, will not be described any further.

The processor 304 may be responsible for managing the bus and general processing, including the execution of software stored on the machine-readable media 306. The processor 304 may be implemented with one or more general-purpose and/or special-purpose processors. Examples include microprocessors, microcontrollers, DSP processors and other circuitry that can execute software. Software may be construed broadly to mean instructions, data or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials. In an aspect of the present disclosure, the processing system 300 may perform or direct operations 1100 in FIG. 11 and/or other processes for the techniques described herein.

In the hardware implementation illustrated in FIG. 3, the machine-readable media 306 is shown as part of the processing system 300 separate from the processor 304. However, as those skilled in the art will readily appreciate, the machine-readable media 306, or any portion thereof, may be external to the processing system 300. By way of example, the machine-readable media 306 may comprise a transmission line, a carrier wave modulated by data, and/or a computer product separate from the wireless node, all which may be accessed by the processor 304 through the bus interface 308. Alternatively, or in addition to, the machine readable media 306, or any portion thereof, may be integrated into the processor 304, such as the case may be with cache and/or general register files.

The processing system 300 may be configured as a general-purpose processing system with one or more microprocessors providing the processor functionality and external memory providing at least a portion of the machine-readable media 306, all linked together with other supporting circuitry through an external bus architecture. Alternatively, the processing system 300 may be implemented with an ASIC (Application Specific Integrated Circuit) with the processor 304, the bus interface 308, the user interface 312 (in the case of an access terminal), supporting circuitry (not shown), and at least a portion of the machine-readable media 306 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 300 depending on the particular application and the overall design constraints imposed on the overall system.

Certain aspects of the present disclosure support methods and apparatuses for constructing a training sequence within a VHT preamble. The construction may be performed such that to achieve a sufficiently low level of PAPR while transmitting the training sequence. In an aspect of the present disclosure, the training sequence may comprise a VHT-STF sequence with a specific repetition time period in accordance with legacy wireless communication standards.

Figure 4:
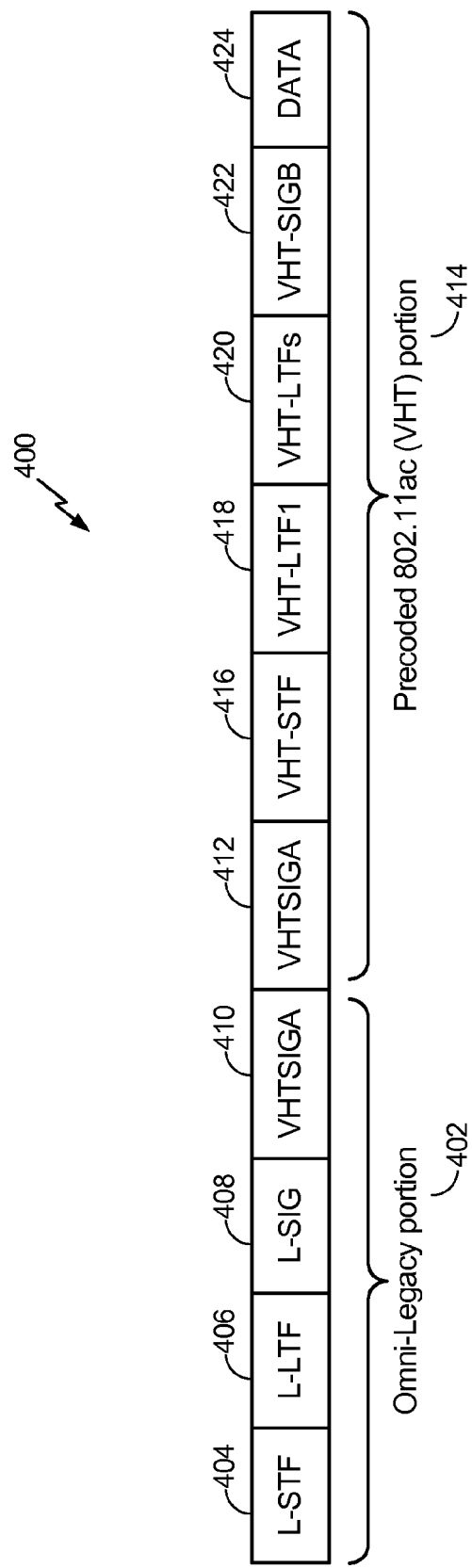
FIG. 4 illustrates an example structure of preamble comprising a very high throughput short training field (VHT-STF) sequence in accordance with certain aspects of the present disclosure.

Methods for Constructing Short Training Field (STF) Sequence for 80 MHz Channel Bandwidth FIG. 4 illustrates an example structure of a preamble 400 comprising training and signal sequences in accordance with certain aspects of the present disclosure. The preamble 400 may be constructed at an access point (AP) of a wireless communication system, and may be transmitted in accordance with IEEE 802.11 family of wireless communications standards.

In an aspect of the present disclosure, the preamble 400 may comprise an omni-legacy portion 402 and a precoded IEEE 802.11ac VHT portion 414. The legacy portion 402 may comprise at least one of: a Legacy Short Training Field (L-STF) 404, a Legacy Long Training Field 406, a Legacy Signal (L-SIG) field 408, or two OFDM symbols 410, 412 for Very High Throughput Signal fields type A (VHT-SIG-A fields). The VHT-SIG-A fields 410, 412 may be transmitted omni-directionally. The precoded IEEE 802.11ac VHT portion 414 may comprise at least one of: a Very High Throughput Short Training Field (VHT-STF) 416, a Very High Throughput Long Training Field 1 (VHT-LTF1) 418, Very High Throughput Long Training Fields (VHT-LTFs) 420, a Very High Throughput Signal field type B (VHT-SIG-B field 422), or a data portion 424. In an aspect, the VHT-SIG-B field may comprise one OFDM symbol and may be transmitted precoded/beamformed.

Robust multi-user (MU) MIMO reception may require that the AP transmits the VHT-LTF training sequence 420 to all supported users. The VHT-LTF sequence 420 may allow each user to estimate a MIMO channel from all transmit AP antennas to all receive antennas of that user. In an aspect, that particular user may utilize the estimated channel to perform effective interference nulling from MU-MIMO streams corresponding to other users in the system.

The VHT-STF sequence 416 of the preamble 400 may be utilized at a user terminal for start-of packet detection and AGC settings. In an aspect of the present disclosure, a novel structure of the VHT-STF sequence 416 may be constructed in an effort to minimize (or at least reduce) a level of PAPR at the AP, while the VHT-STF may feature a specific repetition period for receiver compatibility with different standards. In an aspect of the present disclosure, the repetition period may comprise 800 ns, as specified for the IEEE 802.11n standard.

The IEEE 802.11n specification defines the use of cyclic delayed STF sequences for transmissions from up to four antennas. For VHT based systems, the STF sequence may need to be extended to support up to eight transmit antennas (spatial streams). If the same STF sequence is utilized as specified for the IEEE 802.11n standard, AGC power setting accuracy may be negatively affected in case of transmission from more than four antennas. Power errors may be up to 10 dB, which may lead to extra receiver backoff and a higher required number of effective analog-to-digital converter (ADC) bits at a receiver. A structure of VHT-STF sequence is proposed in the present disclosure that may minimize power differences between a preamble and data portion of VHT transmission packet, while retaining the 800 ns repetition interval specified for the IEEE 802.11n standard.

For accurate AGC gain settings, the power of received STF sequence should be equal to the power of received data symbols. In order to achieve this, it may be required to minimize correlation between STF sequences transmitted from different streams and/or transmitters. In IEEE 802.11n systems with up to four spatial streams/transmitters, High Throughput Short Training Field (HT-STF) sequences on different streams and/or transmitters may utilize a cyclic delay difference that is multiple of 200 ns. For eight streams or transmitters, the cyclic delay multiple cannot exceed 100 ns as the repetition interval is only 800 ns. It will be shown in the present disclosure that the cyclic delay multiple of 100 ns may not be a preferred choice as it may break in a pure line-of-sight channel.

The VHT-STF sequence for transmission over 80 MHz channel bandwidth as specified by the VHT standard may be derived based on two approaches. In one aspect of the present disclosure, the 80 MHz VHT-STF sequence may be generated from the 40 MHz HT-STF sequence by duplicating it and frequency shifting to retain high autocorrelation properties and desirable short repetition periods. This approach can be referred to as a "Legacy Approach" since the existing 40 MHz HT-STF sequence may be utilized. In another aspect of the present disclosure, four 20 MHz IEEE 802.11n STF sequences may be utilized with appropriately applying phase rotation per 20 MHz subbands. This approach can be referred to as a "New Sequence Approach", since new 20 MHz sequences may be constructed by applying the phase rotations.

Legacy Approach for Constructing STF Sequences for 80 MHz Channel Bandwidth

In one aspect of the present disclosure, the 80 MHz VHT-STF sequence may be constructed based on the IEEE 802.11n STF sequence designed for transmission over 40 MHz bandwidth by duplicating this sequence and frequency shifting (i.e., the method referred to as the "Legacy Approach"). The constructed 80 MHz VHT-STF may be defined as:

$$S_{-122,122} = \qquad (1)$$

$$\sqrt{\frac{1}{2}} \{0, 0, 1+j, 0, 0, 0, -1-j, 0, 0, 0, 1+j, 0, 0, 0, -1-j, 0, 0,$$
$$0, -1-j, 0, 0, 0, , 1+j, 0, 0, 0, 0, 0, 0, 0, -1-j, 0, 0, 0,$$
$$-1-j, 0, 0, 0, 1+j, 0, 0, 0, 1+j, 0, 0, 0, 1+j, 0, 0, 0, 0,$$
$$1+j, 0, 0, 0, 0, 0, 0, 0, 0, 0, 0, 0, 0, 0, 0, 0, 1+j, 0, 0, 0,$$
$$-1-j, 0, 0, 0, 1+j, 0, 0, 0, -1-j, 0, 0, 0, -1-j, 0, 0, 0,$$
$$1+j, 0, 0, 0, 0, 0, 0, 0, -1-j, 0, 0, 0, -1-j, 0, 0, 0, 1+j,$$
$$0, 0, 0, 1+j, 0, 0, 0, 1+j, 0, 0, 0, 1+j, 0, 0, 0, 0, 0, 0, 0,$$
$$0, 0, 0, 0, 0, 0, 0, 0, 1+j, 0, 0, 0, -1-j, 0, 0, 0, 1+j, 0,$$
$$0, 0, -1-j, 0, 0, 0, -1-j, 0, 0, 0, 1+j, 0, 0, 0, 0, 0, 0, 0,$$
$$-1-j, 0, 0, 0, -1-j, 0, 0, 0, 1+j, 0, 0, 0, 1+j, 0, 0, 0,$$
$$1+j, 0, 0, 0, 1+j, 0, 0, 0, 0, 0, 0, 0, 0, 0, 0, 0, 0, 0, 0, 0,$$
$$1+j, 0, 0, 0, -1-j, 0, 0, 0, 1+j, 0, 0, 0, -1-j, 0, 0, 0,$$
$$-1-j, 0, 0, 0, 1+j, 0, 0, 0, 0, 0, 0, 0, -1-j, 0, 0, 0, -1-j,$$
$$0, 0, 0, 1+j, 0, 0, 0, 1+j, 0, 0, 0, 1+j, 0, 0, 0, 1+j, 0, 0\}.$$

It can be observed from equation (1) that the constructed VHT-STF sequence may comprise 28 symbols of $e^{j\pi/4} = r l; \sqrt{\frac{1}{2}} r l x(1+j)$ and 20 symbols of $e^{j5\pi/4} = r l; \sqrt{\frac{1}{2}} r l x(-1-j)$ placed at indexes that are multiple of four in spectral lines of $S_{-122,122}$. A desirable repetition period (e.g., of 800 ns, as defined by the IEEE 802.11n standard) may be preserved, and, therefore, the use of same autocorrelation detector may be allowed as for a receiver utilized in the IEEE 802.11n wireless system.

FIG. 5 illustrates an example of peak-to-average power ratio (PAPR) results for transmitting VHT-STF sequences over 80 MHz channel bandwidth, wherein the VHT-STF sequences may be designed based on the "Legacy Approach" in accordance with certain aspects of the present disclosure. Those cases labeled in FIG. 5 as "with rotation" refer to VHT-STF sequences generated from the VHT-STF sequence defined by equation (1), where the upper frequency band of 40 MHz may be rotated by 90 degrees. It can be observed from FIG. 5 that utilizing 256-point inverse fast Fourier transform (IFFT) with no oversampling before transmission (i.e., with transmission rate of 80 Mega samples per second) may provide lower bounds of PAPR results for oversampling cases (i.e., cases from FIG. 5 with transmission rate of 320 Mega samples per second).

In the case of oversampling with 1024-point IFFT, the PAPR results for approaches with and without phase rotation may be very close, both larger than 7 dB, as illustrated in FIG. 5. In the case of 256-point IFFT and oversampling with 4-times time domain interpolation (labeled in FIG. 5 as "4×TDI"), the PAPR results may largely depend on filtering parameters. For example, the PAPR results given in FIG. 5 may be obtained with a normalized filter cutoff frequency of 0.25, which may be a preferred frequency for this type of filtering. As illustrated in FIG. 5, the VHT-STF sequence constructed by applying 90 degree phase rotation of the upper 40 MHz frequency band may provide the PAPR of 5.2810 dB, which is substantially smaller than the PAPR of 8.9380 dB when no phase rotation is applied.

It can be observed from FIG. 5 that the phase rotation of the upper 40 MHz frequency band may reduce the PAPR. Further PAPR reduction may be achieved if all subcarriers are divided into more segments and different phase rotation is applied in each segment.

New Sequence Approach for Constructing STF Sequences for 80 MHz Channel Bandwidth In an aspect of the present disclosure, the 80 MHz VHT-STF sequence may be constructed by using four IEEE 802.11n based STF sequences in 20 MHz subbands covered by a complementary sequence, which may be equivalent to phase rotation on each 20 MHz subband (i.e., the method referred to as the "New Sequence Approach"). The constructed 80 MHz VHT-STF sequence may be defined as:

$$S_{-122,122} = \qquad (2)$$

$$\sqrt{\frac{1}{2}} \{c1.*[0, 0, 1+j, 0, 0, 0, -1-j, 0, 0, 0, 1+j, 0, 0, 0,$$
$$-1-j, 0, 0, 0, -1-j, 0, 0, 0, , 1+j, 0, 0, 0],$$
$$c1.*[0, 0, 0, 0, -1-j, 0, 0, 0, -1-j, 0, 0, 0, 1+j, 0, 0, 0,$$
$$0, 1+j, 0, 0, 0, 1+j, 0, 0, 0, 1+j, 0, 0, 0, 0, 0, 0, 0],$$
$$c2.*[0, 0, 0, 0, 0, 0, 0, 0, 1+j, 0, 0, 0, -1-j, 0, 0, 0,$$
$$1+j, 0, 0, 0, -1-j, 0, 0, 0, -1-j, 0, 0, 0, 1+j, 0, 0, 0],$$
$$c2.*[0, 0, 0, 0, -1-j, 0, 0, 0, -1-j, 0, 0, 0, 1+j, 0,$$
$$0, 0, 1+j, 0, 0, 0, 1+j, 0, 0, 0, 1+j, 0, 0, 0, 0, 0, 0, 0],$$
$$c3.*[0, 0, 0, 0, 0, 0, 0, 0, 1+j, 0, 0, 0, -1-j, 0, 0, 0,$$
$$1+j, 0, 0, 0, -1-j, 0, 0, 0, -1-j, 0, 0, 0, 1+j, 0, 0, 0],$$
$$c3.*[0, 0, 0, 0, -1-j, 0, 0, 0, -1-j, 0, 0, 0, 1+j, 0,$$
$$0, 0, 1+j, 0, 0, 0, 1+j, 0, 0, 0, 1+j, 0, 0, 0, 0, 0, 0, 0],$$
$$c4.*[0, 0, 0, 0, 0, 0, 0, 0, 1+j, 0, 0, 0, -1-j, 0, 0, 0,$$
$$1+j, 0, 0, 0, -1-j, 0, 0, 0, -1-j, 0, 0, 0, 1+j, 0, 0, 0],$$
$$c4.*[0, 0, 0, 0, -1-j, 0, 0, 0, -1-j, 0, 0, 0, 1+j,$$
$$0, 0, 0, 1+j, 0, 0, 0, 1+j, 0, 0, 0, 1+j, 0, 0\},$$

where [c1 c2 c3 c4] is the complementary sequence. In an aspect, the VHT-STF sequence from equation (2) may provide the same transmission power and same repetition time of 800 ns as the VHT-STF sequence given by equation (1).

FIGS. 6A-6B illustrate examples of PAPR results for 80 MHz VHT-STF sequences designed based on the "New Sequence" approach with various phase rotation patterns applied on 20 MHz subbands as defined by equation (2) in accordance with certain aspects of the present disclosure. It can be observed that the VHT-STF sequences constructed based on four 20 MHz 802.11n STFs by applying different complementary sequences may provide better PAPR results (see PAPR results from FIGS. 6A-6B) than the VHT-STF sequences constructed based on the 40 MHz 802.11n STF sequences according to the "Legacy Approach" (see PAPR results from FIG. 5). It can be observed from FIG. 6A that the complementary sequence [c1 c2 c3 c4]=[1 j −1 j] may provide preferred PAPR results, which means that phase rotation of 90 degrees applied to odd/even 20 MHz subbands may reduce the PAPR. It can be also observed from FIGS. 6A-6B that the phase rotation of upper 40 MHz frequency band may not provide any further reduction of the PAPR.

To summarize, the 80 MHz VHT-STF sequences with repetition time of 800 ns may be constructed to provide preferred PAPR results by utilizing either 40 MHz 802.11n STF symbol values or 20 MHz 802.11n STF symbol values with appropriately chosen phase rotation per 20 MHz subband. The PAPR results can be optimized based on both oversampled and non-oversampled VHT-STF signals. Further phase rotation applied to an upper frequency band (e.g., the frequency band of 40 MHz) may not be efficient for reducing the PAPR.

Method for Constructing Modified STF Sequences Based on Orthogonal Sequences

Utilizing cyclic delayed STF sequences for transmission of a base STF sequence from multiple antennas may not scale well for more than four spatial streams or transmitters, i.e. large power errors may occur when using 8 or 16 spatial streams, which may be required in VHT wireless systems. Certain aspects of the present disclosure support modifying the above constructed VHT-STF sequences in order to improve gain setting accuracy in the VHT systems.

To minimize the correlation of VHT-STF symbols from different transmission streams (antennas), it is proposed in the present disclosure to multiply a plurality of STF subcarrier values by orthogonal sequences. In an aspect of the present disclosure, non-zero VHT-STF subcarriers of each transmit antenna may be multiplied with a different orthogonal sequence (e.g., a Walsh sequence). According to certain aspects, the repetition interval of 800 ns may be maintained in the modified VHT-STF sequences.

In an aspect of the present disclosure, for each stream/transmitter, 24 non-zero subcarrier values of IEEE 802.11n 40 MHz STF sequence may be multiplied with orthogonal sequences of length 24. In another aspect, for each stream/transmitter, 12 non-zero subcarrier values of 20 MHz STF sequence may be multiplied with orthogonal sequences of length 12.

In one exemplary case, the length 24 Hadamard sequences (Walsh codes) may be applied on 24 non-zero subcarriers of 40 MHz STF sequence. Hence, the STF subcarriers k for a transmit antenna m may be modified as:

$$s_{mk} = w_{mk} \cdot s_k, \quad (3)$$

where the vector $s_k$ may represent 24 non-zero subcarrier values of the IEEE 802.11n STF sequence and $w_{mk}$ may represent ±1 values from an orthogonal Hadamard matrix of size 24×24. In an aspect of the present disclosure, one row of the Hadamard matrix may comprise a Walsh sequence.

Figure 7:
FIG. 7 illustrates example Hadamard matrix with Walsh codes that may be utilized for generating VHT-STF sequences in accordance with certain aspects of the present disclosure.

In another exemplary case, the length 12 Hadamard sequences (i.e., orthogonal Walsh codes) may be applied on 12 non-zero subcarriers of 20 MHz STF sequence. Hence, the STF subcarriers k for a transmit antenna m may be modified as defined in equation (3), where the vector $s_k$ may represent 12 non-zero subcarrier values of the 20 MHz STF sequence and $w_{mk}$ may represent ±1 values from an orthogonal Hadamard matrix of size 12×12, which is illustrated in FIG. 7. In an aspect of the present disclosure, only first eight rows of the Hadamard matrix 700 may be utilized. As illustrated in FIG. 7, the first row of the Hadamard matrix 700 may comprise all ones, which means no change to the legacy STF sequence for a first spatial stream (or a first transmitter).

In the case of 80 MHz channel bandwidth, there may be 48 non-zero subcarrier values of the VHT-STF sequence. In an aspect of the present disclosure, orthogonal sequences may be chosen from an orthogonal Hadamard matrix of size 48×48 (i.e. the Hadamard(48)). The subcarrier sequence $s_k$ may comprise the VHT-STF sequence defined by equation (2) with [c1 c2 c3 c4]=[1 j −1 j] rotation pattern applied on 20 MHz subbands.

FIG. 8 illustrates an example of PAPR results for Walsh covered 80 MHz VHT-STF sequences in accordance with certain aspects of the present disclosure. Those cases labeled in FIG. 8 as "with rotation" refer to VHT-STF sequences that may be generated by rotating the upper frequency band of 40 MHz by 90 degrees. The PAPR results are sorted in ascending order (column 802), and the corresponding row indexes of the Hadamard(48) matrix with Walsh codes are listed in the column 804 in FIG. 8.

It can be observed by comparing PAPR results from FIGS. 6A-6B and FIG. 8 that the level of PAPR for Walsh covered VHT-STF sequences (FIG. 8) may be higher than or equal to the PAPR results of the base sequence (FIGS. 6A-6B). It should be also noted that for the row index 1 of the Hadamard (48) matrix, the Walsh sequence may comprise all ones. Therefore, the VHT-STF sequence covered by this Walsh sequence may be identical to the base sequence.

In an aspect, a different Walsh sequence may be utilized for each spatial stream. For example, 16 preferred Walsh sequences may be chosen from 48 sorted sequences given in FIG. 8 for possible 16 spatial streams in the VHT transmission operation.

When being limited to eight spatial streams (transmitters), construction of the Walsh covered VHT-STF sequences may be simplified by utilizing the Hadamard matrix of size 12×12 (e.g., the Hadamard matrix 700 from FIG. 7) in order to obtain eight orthogonal 20 MHz VHT-STF sequences. The 40 MHz and 80 MHz VHT-STF sequences may be obtained by copying the 20 MHz sequences and applying a phase rotation pattern.

FIG. 9 illustrates an example of PAPR results for the simplified Walsh covered 80 MHz VHT-STF sequences in accordance with certain aspects of the present disclosure. Phase rotation patterns [c1 c2 c3 c4]=[1 j −1 j]/[1 −1 1 1]/[1 1 −1 1] may be applied on 20 MHz subbands. Those cases labeled in FIG. 9 as "with rotation" represent VHT-STF sequences obtained by rotating the upper band of 40 MHz by 90 degrees. As illustrated in FIG. 9, the PAPR results are sorted in ascending order (column 902), and the corresponding row indexes of Hadamard(12) matrix are listed in the column 904.

Figure 10:
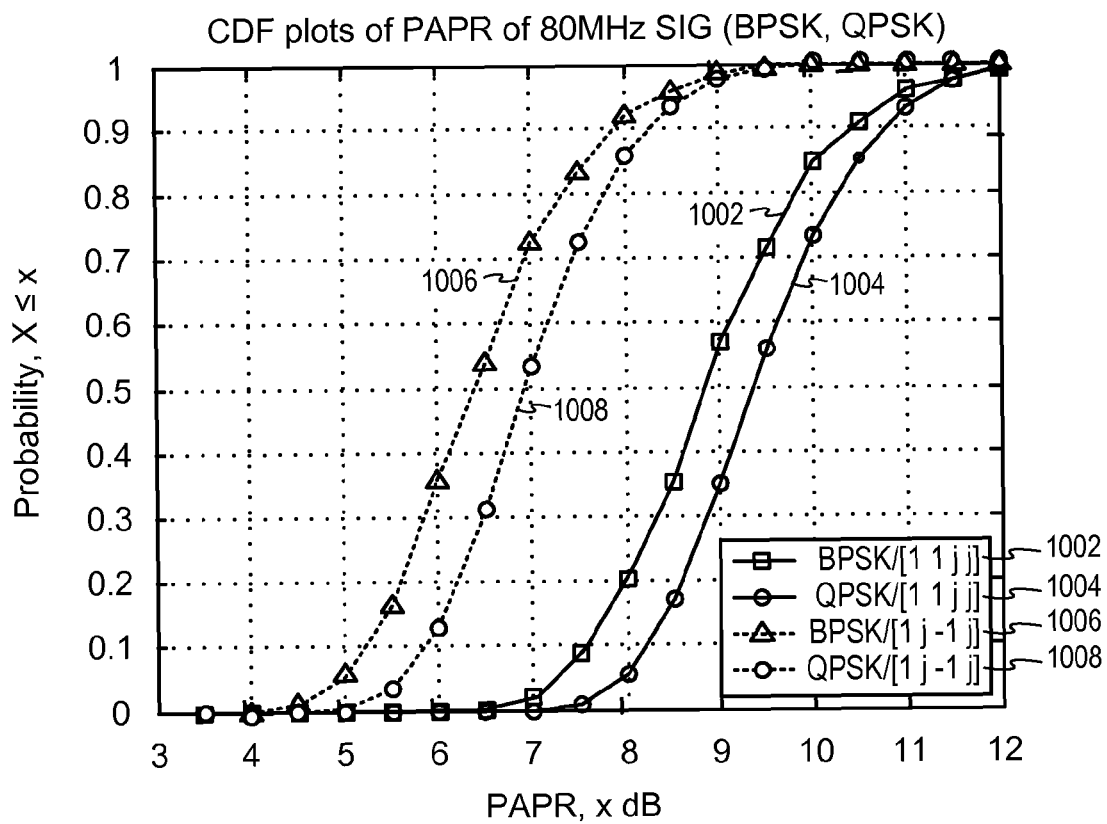
FIG. 10 illustrates example graphs of PAPR results for a Signal (SIG) sequence of a VHT preamble in accordance with certain aspects of the present disclosure.

FIG. 10 illustrates example graphs of PAPR results for 80 MHz Signal (SIG) field of a VHT preamble in accordance with certain aspects of the present disclosure. In an aspect, random BPSK/QPSK-modulated symbols may be assigned to IEEE 802.11a data tones in 20 MHz sub-band, and pilot values may be inserted into four pilot tones. Then, this 20 MHz sequence may be repeated three more times to generate 80 MHz SIG subcarrier values. On top of this 80 MHz SIG sequence, phase rotation may be applied on 20 MHz subbands. The presented results in FIG. 10 are averaged over $10^4$ SIG symbols.

It can be observed from FIG. 10 that rotation pattern [1 j −1 j] (which is also the preferred rotation pattern for constructing the 80 MHz VHT-STF sequence, as given in FIG. 9) shows about 2.5 dB PAPR gain over the rotation pattern [1 1 j j] (i.e., SIG construction in accordance with the IEEE 802.11n standard), for both BPSK and QPSK modulations (plot 1006 vs. plot 1002, and plot 1008 vs. plot 1004 in FIG. 10). Furthermore, it can be observed from FIG. 10 that the PAPR results for QPSK modulation (the plots 1008, 1006) are approximately 0.5 dB worse than the PAPR results for BPSK modulation (the plots 1004, 1002).

Figure 11:
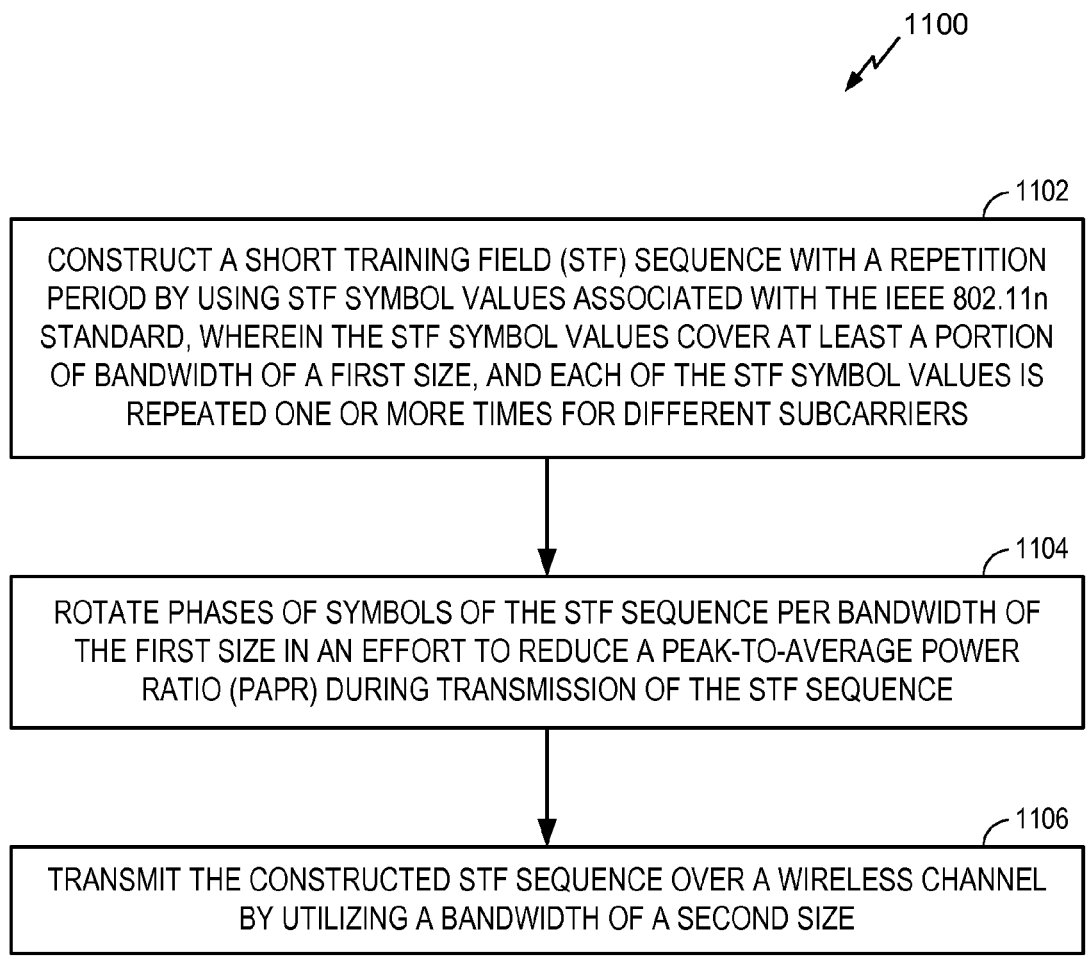
FIG. 11 illustrates example operations of constructing a VHT-STF sequence within a preamble that may be performed at an access point of a VHT wireless communication system in accordance with certain aspects of the present disclosure.

FIG. 11 illustrates example operations 1100 of constructing an STF sequence for transmission over 80 MHz channel in accordance with certain aspects of the present disclosure. The operations 1100 may be performed at an access point of a VHT based wireless communication system. At 1102, the STF sequence with a defined repetition time may be constructed by using STF symbol values associated with the IEEE 802.11n standard, wherein the STF symbol values may cover at least a portion of bandwidth of a first size, and wherein each of the STF symbol values may be repeated one or more times for different subcarriers. At 1104, phases of symbols of the STF sequence may be rotated per bandwidth of the first size in an effort to minimize (or at least reduce) the PAPR during transmission of the STF sequence. At 1106, the constructed STF sequence may be transmitted over a wireless channel by utilizing a bandwidth of a second size.

In addition, phases of a plurality of symbols of the STF sequence may be rotated in a further effort to reduce the PAPR, wherein the plurality of symbols is in a portion of the bandwidth of the second size, e.g., the plurality of symbols belongs to an upper frequency band of the STF sequence. In an aspect of the present disclosure, the bandwidth of first size may comprise a bandwidth of 20 MHz, and the bandwidth of second size may comprise a bandwidth of 80 MHz. In another aspect, the bandwidth of first size may comprise a bandwidth of 40 MHz.

In an aspect, the constructed STF sequence may be multiplied with a plurality of orthogonal sequences of symbols (e.g., Walsh codes) to obtain a plurality of modified STF sequences. Each of the modified STF sequences may be transmitted in a different spatial stream.

In an aspect, cyclic delay diversity may be applied on the constructed STF sequence using a plurality of cyclic delays equal to multiples of a defined period to obtain a plurality of cyclically delayed STF sequences. Each of the cyclically delayed STF sequences may be transmitted in a different spatial stream of a plurality of spatial streams. In an exemplary case, the defined period may comprise 50 ns, and the plurality of spatial streams may comprise eight spatial streams.

In an aspect of the present disclosure, each of the STF symbol values may be repeated one time for different subcarriers, as in the aforementioned "Legacy Approach". In another aspect of the present disclosure, each of the STF symbol values is repeated three times for different subcarriers, as in the aforementioned "New Sequence Approach".

Influence of Transmitter Phase Shifts

FIGS. 12A-12G illustrate example results of power error Cumulative Density Function (CDF) for transmissions of different VHT-STF sequences from up to eight transmitters to one receiver. In an aspect of the present disclosure, a mean power of VHT-STF sequence may be significantly larger or smaller (i.e., different) than the power of data sequence, depending on a channel model. This bias may be highly dependent on relative phases of transmitters. In practice, different transmitters may tend to have a random phase offset (e.g., of 180 degrees) because of random initial divider values. To illustrate this effect, power error CDF curves were simulated for two different cases: when all transmitters have the same phase, and when every other transmitter has a phase shift of 180 degrees.

FIGS. 12A-12D illustrate example results of power error CDF for transmissions of VHT-STF sequences from up to eight transmitters over no-line-of site (NLOS) channel type B, NLOS channel type C, NLOS channel type D and NLOS channel type E, respectively. Power error CDF curves 1208, 1218, 1228 and 1238 from FIGS. 12A-12D are obtained by applying Cyclic Delay Diversity (CDD) technique on the VHT-STF sequences with no phase shift between transmitters. Power error CDF curves 1202, 1212, 1222 and 1232 from FIGS. 12A-12D are obtained by applying the CDD technique on the VHT-STF sequences with 180 degrees phase shift between odd/even transmitters. Power error CDF curves 1204, 1214, 1224 and 1234 from FIGS. 12A-12D are obtained by transmitting Walsh covered VHT-STF sequences with no phase shift between transmitters, and power error CDF curves 1206, 1216, 1226 and 1236 from FIGS. 12A-12D are obtained by transmitting Walsh covered VHT-STF sequences with 180 degrees phase shift between odd/even transmitters.

In an aspect, a CDD delay equal to a multiple of 100 ns may be applied on each of the VHT-STF sequences before transmission. The power error CDF results from FIGS. 12A-12D for the CDD delays equal to multiples of 100 ns are summarized in FIG. 12E. It can be observed that approximately 8.5 dB extra receiver backoff may need to be applied to cover 95% of channels (i.e., the power error CDF of 0.025 to 0.975).

Figure 12A:
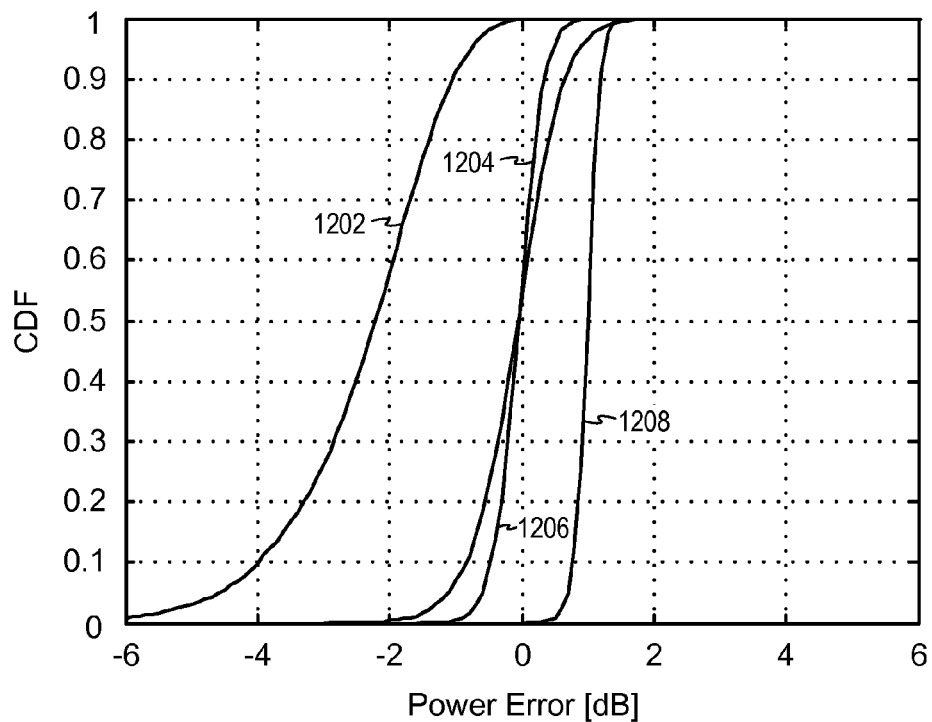
FIGS. 12A-12G illustrate example graphs of power error cumulative density function (CDF) results for various VHT-STF sequences transmitted from up to eight transmitters over different types of channels in accordance with certain aspects of the present disclosure.
Figure 12B:
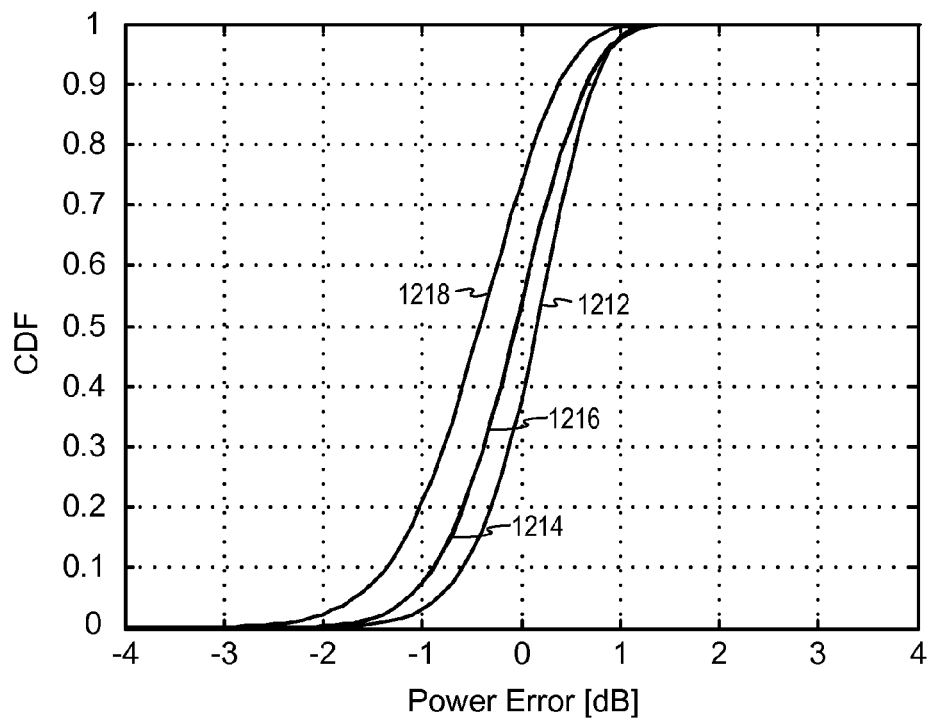
Figure 12C:
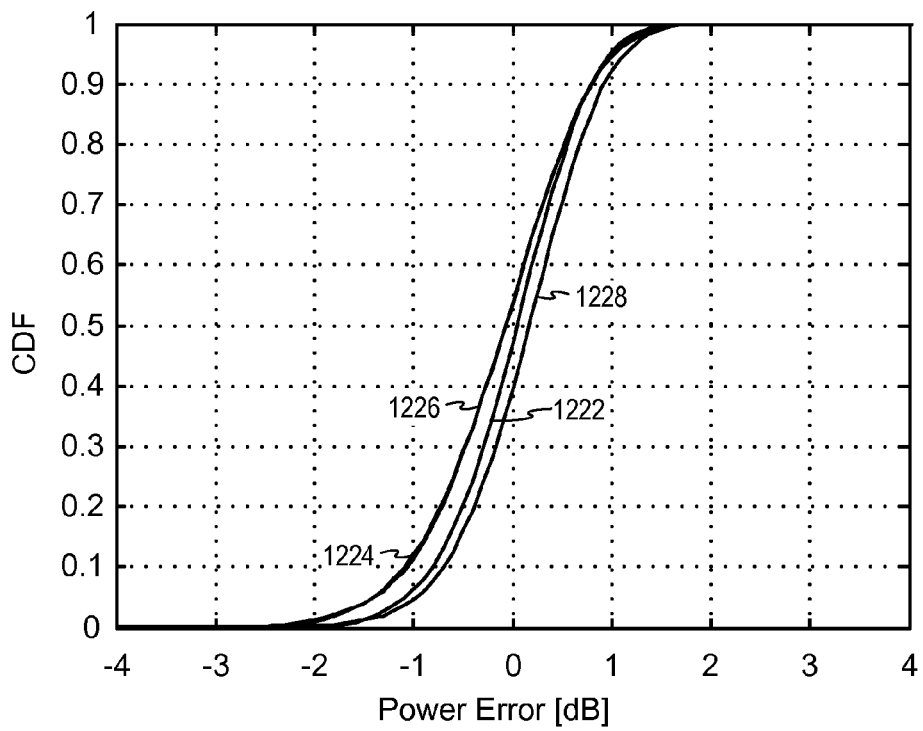
Figure 12D:
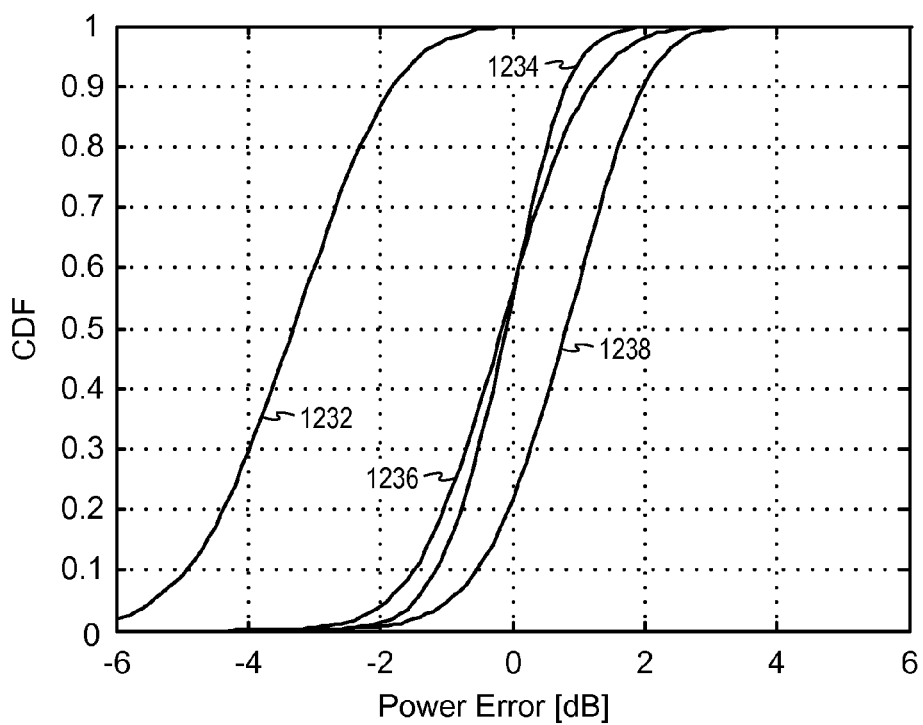
Figure 12E:
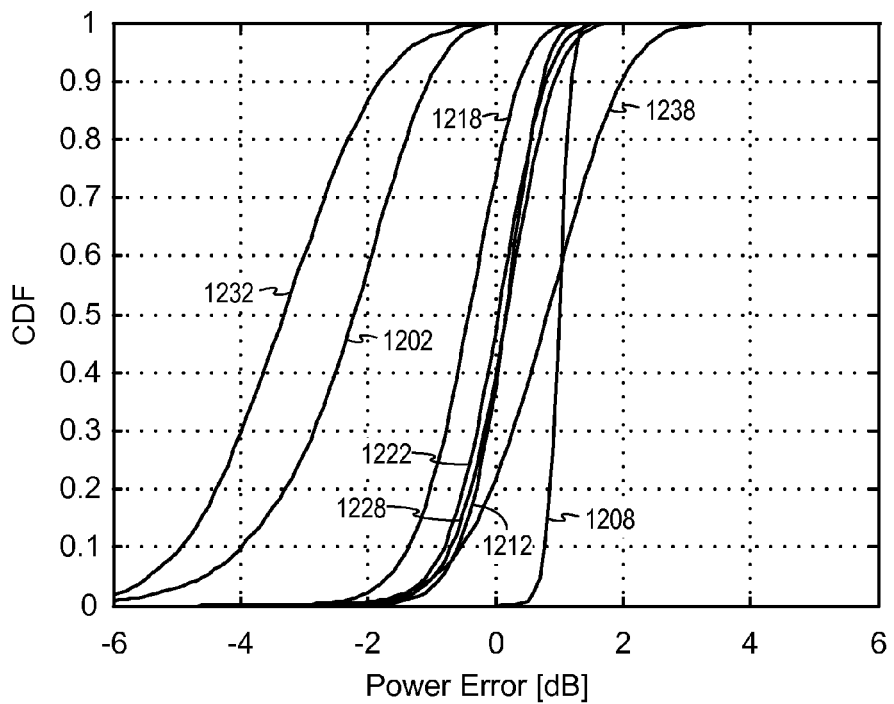
Figure 12F:
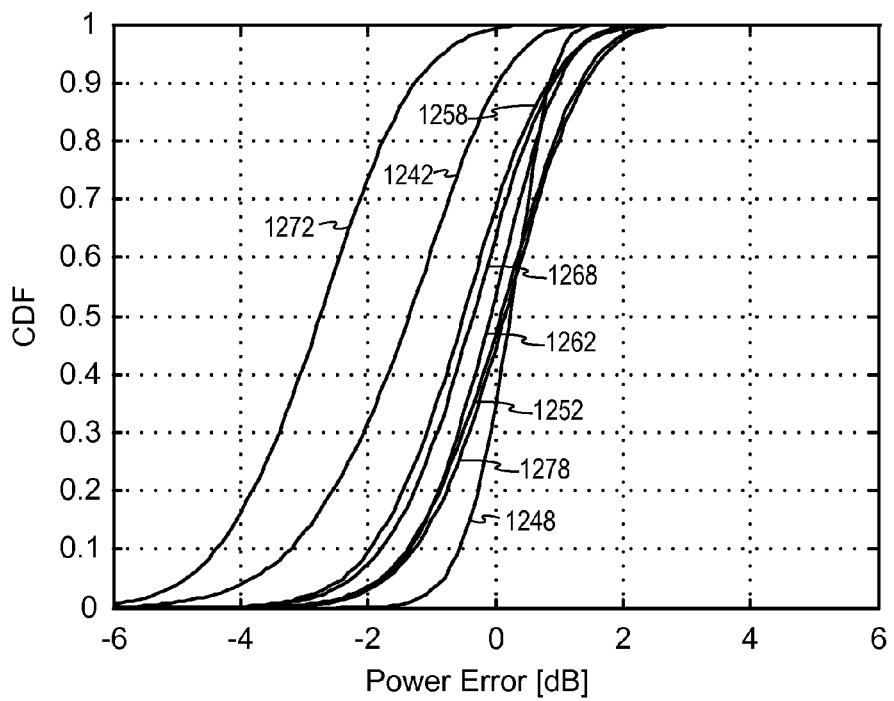

The power error CDF results for the CDD delays equal to multiples of 50 ns are summarized in FIG. 12F for NLOS channels B, C, D and E. Power error CDF curves 1248, 1258, 1268 and 1278 may be obtained by transmitting the cyclically delayed VHT-STF sequences over NLOS channels B, C, D and E, respectively, without phase shift between transmitters. Power error CDF curves 1242, 1252, 1262 and 1272 may be obtained by transmitting the cyclically delayed VHT-STF sequences over NLOS channels B, C, D and E, respectively with phase shift of 180 degrees between odd/even transmitters. It can be observed that approximately 7.5 dB extra receiver backoff may need to be applied to cover 95% of channels (i.e., the power error CDF of 0.025 to 0.975).

Figure 12G:
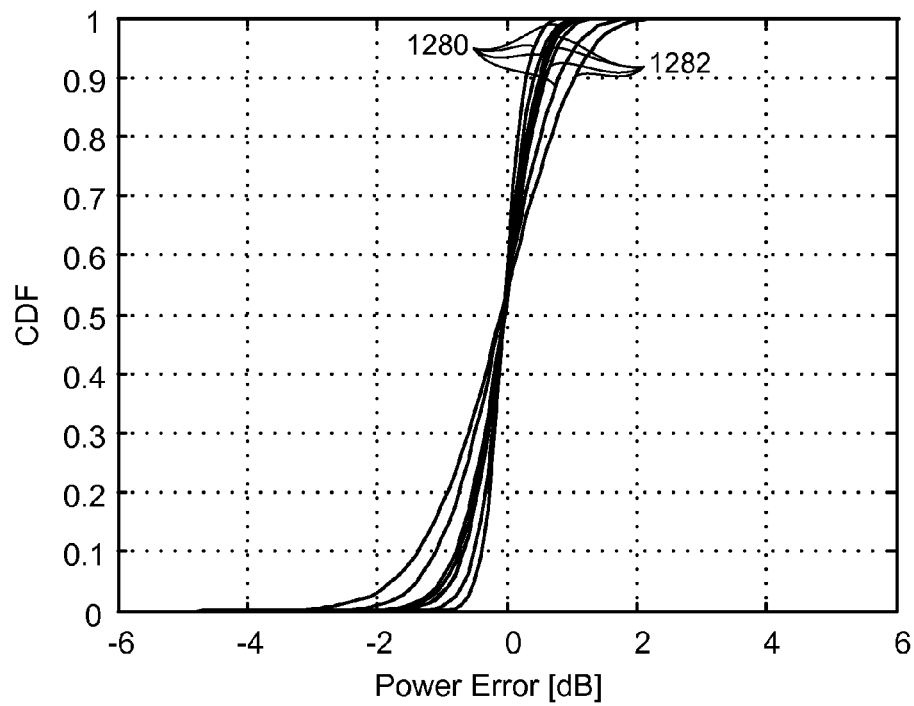

The power error CDF results from FIGS. 12A-12D for the Walsh covered VHT-STF sequences are summarized in FIG. 12G. Plots 1280 illustrate power error CDF results for different channels when all transmitters have the same phase, while plots 1282 illustrate power error CDF results for different channels when odd transmitters have phase shifts of 180 degrees. It can be observed from FIG. 12G that approximately 3.5 dB extra receiver backoff may need to be applied to cover 95% of channels (i.e., the power error CDF of 0.025 to 0.975).

Figure 13A:
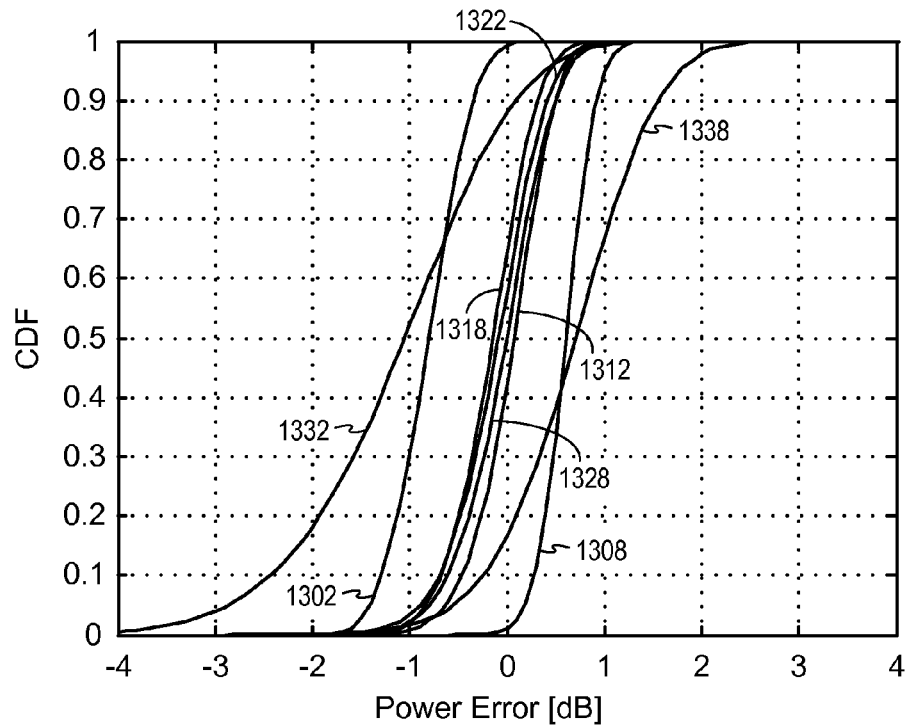
FIGS. 13A-13B illustrate example graphs of power error CDF results for various VHT-STF sequences transmitted from up to four transmitters over different types of channels in accordance with certain aspects of the present disclosure.

The power error CDF results for VHT-STF sequences cyclically delayed by multiples of 200 ns transmitted from up to four transmitters over NLOS channels B, C, D and E are illustrated in FIG. 13A. Power error CDF curves 1308, 1318, 1328 and 1338 are obtained by transmitting the cyclically delayed VHT-STF sequences over NLOS channels B, C, D and E, respectively, without phase shift between transmitters. Power error CDF curves 1302, 1312, 1322 and 1332 are obtained by transmitting the cyclically delayed VHT-STF sequences over NLOS channels B, C, D and E, respectively, with phase shift on odd transmitters of 180 degrees. It can be observed from FIG. 13A that approximately 5.5 dB extra receiver backoff may need to be applied to cover 95% of channels (i.e., the power error CDF of 0.025 to 0.975).

Figure 13B:
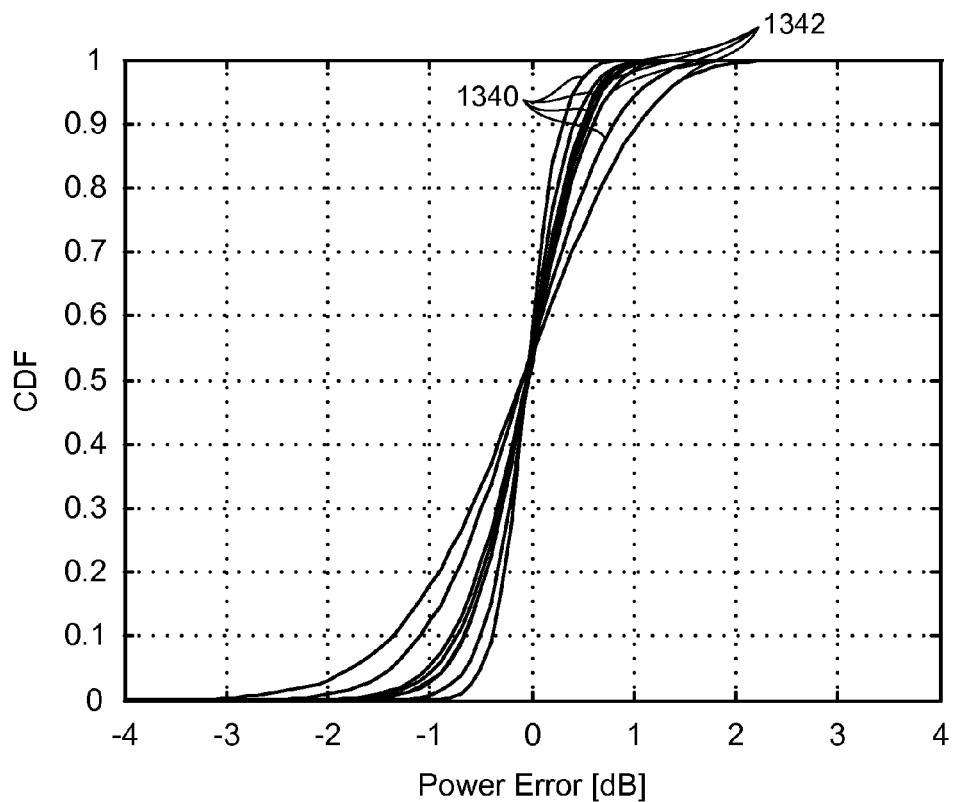

The power error CDF results for Walsh covered VHT-STF sequences transmitted over NLOS channels B, C, D and E from up to four transmitters are illustrated in FIG. 13B. Plots 1340 illustrate power error CDF results for different channels when all transmitters have the same phase, while plots 1342 illustrate power error CDF results for different channels when odd transmitters have phase shifts of 180 degrees. It can be observed from FIG. 13A that approximately 3.5 dB extra receiver backoff may need to be applied to cover 95% of channels (i.e., the power error CDF of 0.025 to 0.975).

Figure 14A:
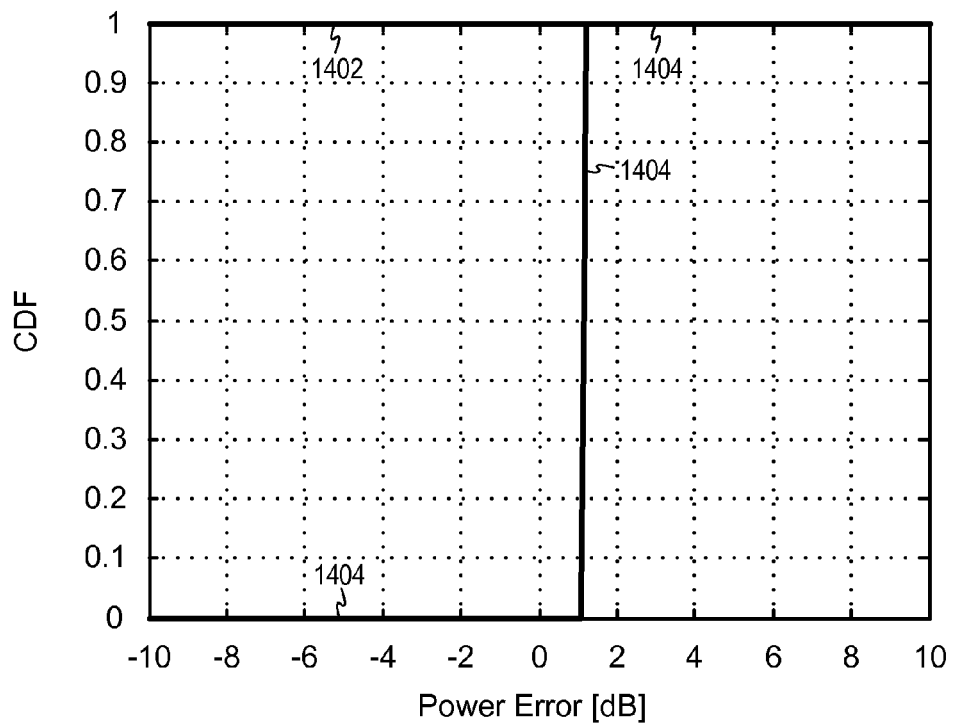
FIGS. 14A-14C illustrate example graphs of power error CDF results for different VHT-STF sequences transmitted from up to eight transmitters over Additive White Gaussian Noise (AWGN) channels in accordance with certain aspects of the present disclosure.

FIG. 14A illustrates example graphs of power error CDF results for cyclically delayed VHT-STF sequences constructed based on the "Legacy Approach" transmitted over Additive White Gaussian Noise (AWGN) channels from up to eight transmitters in accordance with certain aspects of the present disclosure. A CDD delay equal to a multiple of 100 ns may be applied on each VHT-STF sequence before transmission. All simulated AWGN channels may be representative of channels with a very strong line-of-sight component. A plot 1402 in FIG. 14A illustrates power error CDF when all transmitters have the same phase, while a plot 1404 illustrates power error CDF when odd transmitters have phase shifts of 180 degrees.

Figure 14B:
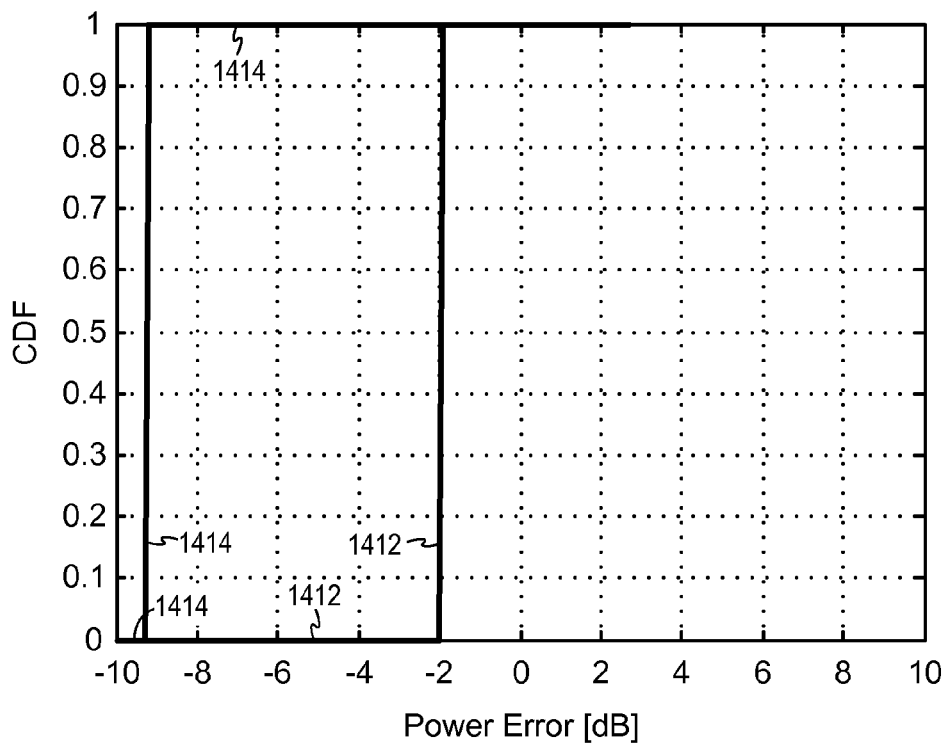

FIG. 14B illustrates example graphs of power error CDF results for cyclically delayed VHT-STF sequences constructed based on the "Legacy Approach" transmitted over AWGN channels from up to eight transmitters in accordance with certain aspects of the present disclosure. A CDD delay equal to a multiple of 50 ns may be applied on each VHT-STF sequence before transmission. All simulated AWGN channels may be representative of channels with a very strong line-of-sight component. A plot 1412 in FIG. 14B illustrates power error CDF when all transmitters have the same phase, while a plot 1414 illustrates power error CDF when odd transmitters have phase shifts of 180 degrees. It can be observed from FIG. 14B that the power error can be larger than 9 dB.

Figure 14C:
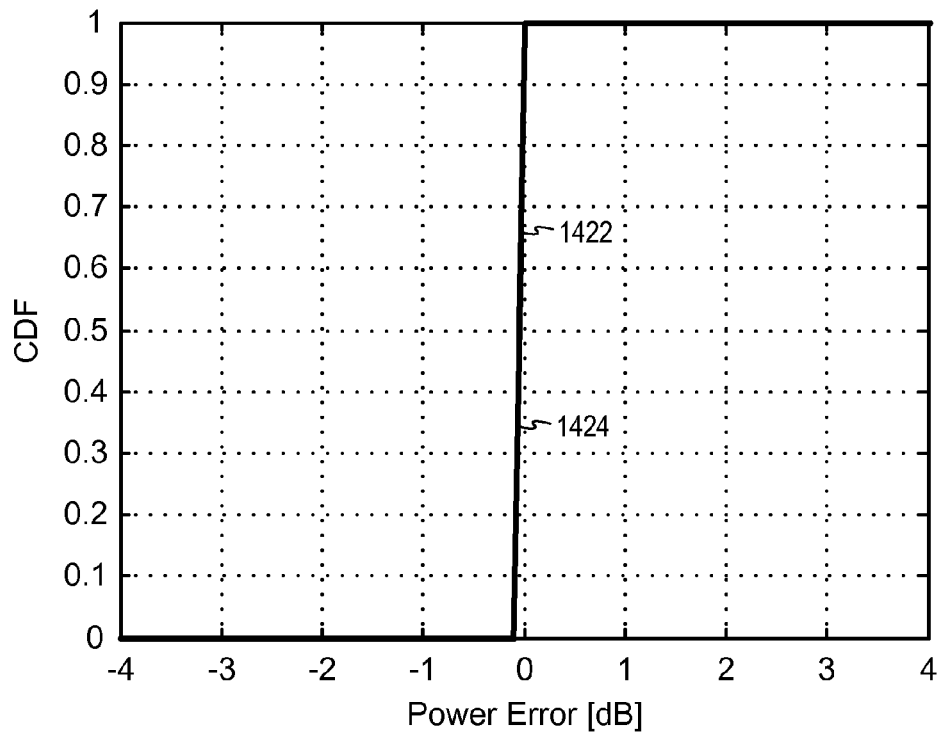

FIG. 14C illustrates example graph of power error CDF results for Walsh covered VHT-STF sequences constructed based on the "Legacy Approach" transmitted over AWGN channels from up to eight transmitters in accordance with certain aspects of the present disclosure. A plot 1422 in FIG. 14C illustrates power error CDF when all transmitters have the same phase, while a plot 1424 illustrates power error CDF when odd transmitters have phase shifts of 180 degrees. It can be observed from FIG. 14C that the power error may be negligible and independent of transmitters' phases.

As illustrated in FIGS. 14A-14B, for more than four transmitters, the 802.11n based HT-STF with cyclic delays gives large AGC gain setting errors because received STF power can be significantly different from received data power. For eight transmitters, cyclic delays equal to multiples of 50 ns (FIG. 12F) may provide better power error CDF results than cyclic delays equal to multiples of 100 ns (FIG. 12E), since in the latter case the cyclic delays may break in a pure line-of-sight. Therefore, the IEEE 802.11ac may utilize cyclic delays equal to multiples of 50 ns for the legacy STF (L-STF) sequences. It should be noted that L-SIG and VHT-SIG-A sequences may be more tolerant to gain inaccuracy than high rate data.

It can be observed, by comparing results from FIG. 12F vs. results from FIG. 12G and results from FIG. 14B vs. results from FIG. 14C, that Walsh covered VHT-STF sequences may provide significantly better results than cyclically delayed VHT-STF sequences. Power accuracy improvement of about 4 dB may be achieved in fading channels (FIG. 12G) and up to 9 dB in a line-of-sight-only case (FIG. 14C). Power accuracy for up to eight transmitters (FIG. 12G) is somewhat better than for up to four transmitters (FIG. 13B). For up to four streams or transmitters, the Walsh-covered VHT-STF sequences (FIG. 13B) provide approximately 3 dB improvement in power accuracy over the 802.11n HT-STF sequences. In addition, no change to gain setting procedure may be required at a receiver side relative to the IEEE 802.11n receiver by preserving the 800 ns repetition interval of the VHT-STF sequence.

Figure 11A:
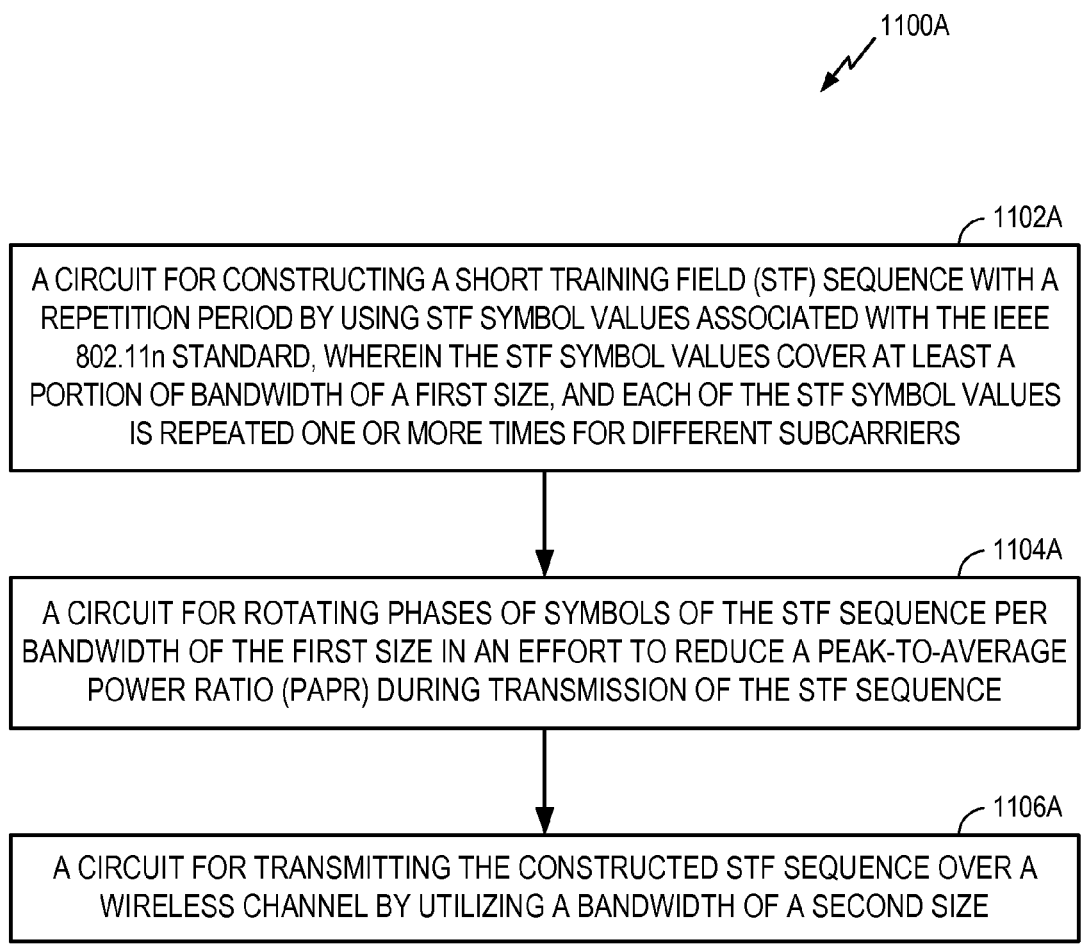
FIG. 11A illustrates example components capable of performing the operations illustrated in FIG. 11.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 1100 illustrated in FIG. 11 correspond to components 1100A illustrated in FIG. 11A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for constructing may comprise an application specific integrated circuit, e.g., the TX data processor 202 of the wireless node 200 from FIG. 2 or the processor 304 of the processing system 300 from FIG. 3. The means for rotating phases may comprise an application specific integrated circuit, e.g., the TX data processor 202 of the wireless node 200 or the processor 304 of the processing system 300. The means for transmitting may comprise a transmitter, e.g., the transceiver 206 of the wireless node 200. The means for performing oversampling may comprise a sampling circuit, e.g., the transceiver 206 of the wireless node 200. The means for multiplying may comprise an application specific integrated circuit, e.g., the TX data processor 202 of the wireless node 200 or the processor 304 of the processing system 300. The means for applying may comprise an application specific integrated circuit, e.g., the TX data processor 202 of the wireless node 200 or the processor 304 of the processing system 300

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
   forming a constructed short training field (STF) sequence from an STF sequence, the constructed STF sequence comprising STF symbol values associated with the IEEE 802.11n standard, wherein
      the STF symbol values cover at least a portion of bandwidth of a first size, and
      each of the STF symbol values is repeated one or more times for different subcarriers;
   wherein said forming comprises one from the group consisting of:
      duplicating and frequency shifting the STF sequence using selected inverse transformation and oversampling functions; and
      rotating phases of symbols of the STF sequence per bandwidth of the first size by multiplying STF symbol values by a selected complementary sequence; and
   transmitting the constructed STF sequence over a wireless channel by utilizing a bandwidth of a second size.

2. The method of claim 1, wherein the bandwidth of first size comprises a bandwidth of 20 MHz or a bandwidth of 40 MHz.

3. The method of claim 1,
   wherein the STF symbol values are in a portion of the bandwidth of the second size.

4. The method of claim 1, further comprising:
   performing an inverse fast fourier transfer (IFFT) transformation and oversampling before the transmitting.

5. The method of claim 1, wherein the bandwidth of second size comprises a bandwidth of 80 MHz.

6. The method of claim 1, wherein the repetition period comprises 800 ns.

7. The method of claim 1, further comprising:
   multiplying the constructed STF sequence with a plurality of orthogonal sequences of symbols to obtain a plurality of modified STF sequences;
   wherein transmitting the constructed STF sequence uses each of the modified STF sequences in a different spatial stream.

8. The method of claim 1, further comprising:
applying cyclic delay on the constructed STF sequence using a plurality of cyclic delays equal to multiples of a defined period to obtain a plurality of cyclically delayed STF sequences;
wherein transmitting the constructed STF sequence uses each of the cyclically delayed STF sequences in a different spatial stream of a plurality of spatial streams.

9. The method of claim 8, wherein:
the defined period comprises 50 ns, and
the plurality of spatial streams comprises eight spatial streams.

10. The method of claim 1, wherein each of the STF symbol values is repeated one time for different subcarriers.

11. The method of claim 1, wherein each of the STF symbol values is repeated three times for different subcarriers.

12. An apparatus for wireless communications, comprising:
a first circuit configured to form a constructed short training field (STF) sequence from an STF sequence, the constructed STF sequence comprising comprising STF symbol values associated with the IEEE 802.11n standard, wherein
the STF symbol values cover at least a portion of bandwidth of a first size, and
each of the STF symbol values is repeated one or more times for different subcarriers;
a second circuit configured to perform one from the group consisting of:
duplicating and frequency shifting the STF sequence using selected inverse transformation and oversampling functions; and
rotating phases of symbols of the STF sequence per bandwidth of the first size by multiplying STF symbol values by a selected complementary sequence; and
a transmitter configured to transmit the constructed STF sequence over a wireless channel by utilizing a bandwidth of a second size.

13. The apparatus of claim 12, wherein the bandwidth of first size comprises a bandwidth of 20 MHz or a bandwidth of 40 MHz.

14. The apparatus of claim 12,
wherein the STF symbol values are in a portion of the bandwidth of the second size.

15. The apparatus of claim 12, further comprising:
a third circuit configured to perform an inverse fast fourier transfer (IFFT) transformation and oversampling before the transmission.

16. The apparatus of claim 12, wherein the bandwidth of second size comprises a bandwidth of 80 MHz.

17. The apparatus of claim 12, wherein the repetition period comprises 800 ns.

18. The apparatus of claim 12, further comprising:
a third circuit configured to multiply the constructed STF sequence with a plurality of orthogonal sequences of symbols to obtain a plurality of modified STF sequences, and wherein the transmitter is configured to transmit the constructed STF sequence using each of the modified STF sequences in a different spatial stream.

19. The apparatus of claim 12, further comprising:
a third circuit configured to apply cyclic delay on the constructed STF sequence using a plurality of cyclic delays equal to multiples of a defined period to obtain a plurality of cyclically delayed STF sequences, and wherein the transmitter is configured to transmit the constructed STF sequence using each of the cyclically delayed STF sequences in a different spatial stream of a plurality of spatial streams.

20. The apparatus of claim 19, wherein:
the defined period comprises 50 ns, and
the plurality of spatial streams comprises eight spatial streams.

21. The apparatus of claim 12, wherein each of the STF symbol values is repeated one time for different subcarriers.

22. The apparatus of claim 12, wherein each of the STF symbol values is repeated three times for different subcarriers.

23. An apparatus for wireless communications, comprising:
means for forming a constructed short training field (STF) sequence from an STF sequence, the constructed STF sequence comprising STF symbol values associated with the IEEE 802.11n standard, wherein
the STF symbol values cover at least a portion of bandwidth of a first size, and
each of the STF symbol values is repeated one or more times for different subcarriers;
wherein said means for forming comprises one from the group consisting of:
means for duplicating and frequency shifting the STF sequence using selected inverse transformation and oversampling functions; and
means for rotating phases of symbols of the STF sequence per bandwidth of the first size by multiplying STF symbol values by a selected complementary sequence; and
means for transmitting the constructed STF sequence over a wireless channel by utilizing a bandwidth of a second size.

24. The apparatus of claim 23, wherein the bandwidth of first size comprises a bandwidth of 20 MHz or a bandwidth of 40 MHz.

25. The apparatus of claim 23,
wherein the STF symbol values are in a portion of the bandwidth of the second size.

26. The apparatus of claim 23, further comprising:
means for performing an inverse fast fourier transfer (IFFT) transformation and oversampling before the transmission.

27. The apparatus of claim 23, wherein the bandwidth of second size comprises a bandwidth of 80 MHz.

28. The apparatus of claim 23, wherein the repetition period comprises 800 ns.

29. The apparatus of claim 23, further comprising:
means for multiplying the constructed STF sequence with a plurality of orthogonal sequences of symbols to obtain a plurality of modified STF sequences, wherein the means for transmitting is configured to transmit the constructed STF sequence using each of the modified STF sequences in a different spatial stream.

30. The apparatus of claim 23, further comprising:
means for applying cyclic delay on the constructed STF sequence using a plurality of cyclic delays equal to multiples of a defined period to obtain a plurality of cyclically delayed STF sequences, wherein the means for transmitting is configured to transmit the constructed STF sequence using each of the cyclically delayed STF sequences in a different spatial stream of a plurality of spatial streams.

31. The apparatus of claim 30, wherein:
the defined period comprises 50 ns, and
the plurality of spatial streams comprises eight spatial streams.

32. The apparatus of claim 23, wherein each of the STF symbol values is repeated one time for different subcarriers.

33. The apparatus of claim 23, wherein each of the STF symbol values is repeated three times for different subcarriers.

34. A computer-program product for wireless communications, comprising a non-transitory computer-readable medium comprising instructions executable to:
　form a constructed short training field (STF) sequence from an STF sequence, the constructed STF sequence comprising STF symbol values associated with the IEEE 802.11n standard, wherein
　　the STF symbol values cover at least a portion of bandwidth of a first size, and
　　each of the STF symbol values is repeated one or more times for different subcarriers;
　wherein said forming comprises one from the group consisting of:
　　duplicate and frequency shift the STF sequence using selected inverse transformation and oversampling functions; and
　　rotate phases of symbols of the STF sequence per bandwidth of the first size by multiplying STF symbol values by a selected complementary sequence; and
　transmit the constructed STF sequence over a wireless channel by utilizing a bandwidth of a second size.

35. An access point, comprising:
　at least one antenna;
　a first circuit configured to form a constructed short training field (STF) sequence from an STF sequence, the constructed STF sequence comprising comprising STF symbol values associated with the IEEE 802.11n standard, wherein
　　the STF symbol values cover at least a portion of bandwidth of a first size, and
　　each of the STF symbol values is repeated one or more times for different subcarriers;
　a second circuit configured to perform one from the group consisting of:
　　duplicating and frequency shifting the STF sequence using selected inverse transformation and oversampling functions; and
　　rotating phases of symbols of the STF sequence per bandwidth of the first size by multiplying STF symbol values by a selected complementary sequence; and
　a transmitter configured to transmit the constructed STF sequence over a wireless channel by utilizing a bandwidth of a second size.

* * * * *